(12) United States Patent
Jia et al.

(10) Patent No.: US 7,545,516 B2
(45) Date of Patent: Jun. 9, 2009

(54) FULL-FIELD THREE-DIMENSIONAL MEASUREMENT METHOD

(75) Inventors: Peirong Jia, Ottawa (CA); Jonathan David Kofman, London (CA); Chad English, Ottawa (CA)

(73) Assignee: University of Waterloo, Ontario (CA)

( * ) Notice: Subject to any disclaimer, the term of this patent is extended or adjusted under 35 U.S.C. 154(b) by 284 days.

(21) Appl. No.: 11/566,026

(22) Filed: Dec. 1, 2006

(65) Prior Publication Data

US 2007/0206204 A1    Sep. 6, 2007

(30) Foreign Application Priority Data

Dec. 1, 2005  (CA) .................................. 2528791

(51) Int. Cl.
*G01B 11/24* (2006.01)
(52) U.S. Cl. ..................... 356/603; 356/604; 356/605; 356/602
(58) Field of Classification Search ......... 356/600–625, 356/4.01, 5.04, 4.06, 4.04, 3.02; 250/237 G, 250/559.22; 348/370, 373, 131–132, 143
See application file for complete search history.

(56) References Cited

U.S. PATENT DOCUMENTS

| | | | | |
|---|---|---|---|---|
| 4,349,277 | A * | 9/1982 | Mundy et al. ................ | 356/604 |
| 4,564,295 | A * | 1/1986 | Halioua ...................... | 356/605 |
| 4,641,972 | A * | 2/1987 | Halioua et al. .............. | 356/604 |
| 5,444,537 | A * | 8/1995 | Yoshimura et al. ........... | 356/603 |
| 6,438,272 | B1 | 8/2002 | Huang et al. | |
| 6,788,210 | B1 | 9/2004 | Huang et al. | |
| 7,098,956 | B2 * | 8/2006 | Keitel et al. ................. | 348/370 |

OTHER PUBLICATIONS

Almazan-Cuellar, S., and Malacara-Hernandez, D., "Two-Step Phase-Shifting Algorithm" Opt. Eng., 42(12) pp. 3524-3531 (2003).

(Continued)

*Primary Examiner*—Sang Nguyen
(74) *Attorney, Agent, or Firm*—Husch Blackwell Sanders LLP Welsh & Katz

(57) ABSTRACT

A method and system for full-field fringe-projection for 3-D surface-geometry measurement, referred to as "triangular-pattern phase-shifting" is disclosed. A triangular grey-scale-level-coded fringe pattern is computer generated, projected along a first direction onto an object or scene surface and distorted according to the surface geometry. The 3-D coordinates of points on the surface are calculated by triangulation from distorted triangular fringe-pattern images acquired by a CCD camera along a second direction and a triangular-shape intensity-ratio distribution is obtained from calculation of the captured distorted triangular fringe-pattern images. Removal of the triangular shape of the intensity ratio over each pattern pitch generates a wrapped intensity-ratio distribution obtained by removing the discontinuity of the wrapped image with a modified unwrapping method. Intensity ratio-to-height conversion is used to reconstruct the 3-D surface coordinates of the object. Intensity-ratio error compensation involves estimating intensity-ratio error in a simulation of the measurement process with both real and ideal captured triangular-pattern images obtained from real and ideal gamma non-linearity functions. A look-up table relating the measure intensity-ratio to the corresponding intensity-ratio error is constructed and used for intensity-ratio error compensation. The inventive system is based on two-step phase-shifting but can be extended for multiple-step phase-shifting.

13 Claims, 15 Drawing Sheets

OTHER PUBLICATIONS

Ayache, H., and Faverjon, B., "Efficient Registration of Stereo Images by Matching Graph Descriptions of Edge Segments" Int'l Journal of Computer Vision, 1(2)7 pp. 107-131 (1987).

Batlle, J., Mouaddib, E., and Salvi, J., "Recent Progress in Coded Structured Light as a Technique to Solve the Correspondence Problem: A Survey" Pattern Recognition, vol. 31 No. 7 pp. 963-982 (1998).

Beraldin, J.-A., Blais, F., Cournoyer L., Godin, G., and Rious, M., "Active 3D Sensing" published in The e-Way into the Four Dimensions of Cultural Heritage Congress. Vienna, Austria. NRC 46495 (Apr. 8-12, 2003).

Besl, P., "Active Optical Range Imaging Sensors" Advances in machine Vision, pp. 1-63, Springer-Verlag (1989).

Blais, F., "Control of Low Inertia Galvanometers for High Precision Laser Scanning Systems" Opt. Eng., 27, pp. 104-110(1988).

Blais, F., Beraldin, J.A., and El-Hakim, S., "Real-Time 3D Pose Estimation Using Photogrammetry and Laser Based Geometrical Target Tracking for Autonomous Operation in Space" Proceedings of the 5th Conference on Optical 3-D Measurement Techniques. Vienna, Austria (Oct. 1-3, 2001).

Blais, F., "A Review of 20 Years of Range Sensor Development" Proc. Of SPIE-IS&T Electronic Imaging, SPIE vol. 5013, pp. 62-76 (2003).

Box, G.E.O, and Muller, M.A., "A Note on the Generation of Random Normal Deviates" Annals Math, Stats, V. 29 610-611 (1958).

Boyer, K., and Kak, A., "Collor-Encoded Structured Light for Rapid Active Ranging" IEEE Trans. Pattern Analysis and Machine Intelligence, pp. 14-28 (1987).

Cao, Y., and Su, X. "RGB Tricolor Based Fast Phase Measuring Profilometry" Proc. SPIE, vol. 4919, pp. 528-535 (2002).

Carrihill, B. and Hummel, R., "Experiments With the Intensity-Ratio Depth Sensor" In Computer Vision, Graphics and Image Processing, vol. 32, pp. 337-358, Academic Press (1985).

Chaing, F. P., "A Shadow Moire Method With Two Discrete Sensitivities" Exper. Mech. 15 (10) pp. 384-385 (1975).

Chazan, G. and Kiryati, N., "Pyramidal Intensity-Ratio Depth Sensor" Technical Report 121, Center for Communication and Information Technologies, Department of Electrical Engineering, Technion, Haifa, Isreal (Oct. 1995).

Chen, C., Hung, Y., Chiang, C., and Wu, J., "Range Data Acquisition Using Color Structured Lighting and Stereo Vision" Image and Vision Computing, vol. 15, pp. 445-456(1997).

Chen, X., Gra,aglia, M., and Yeazell, J., "Phase-Shift Calibration Algorithm for Phase-Shifiting Interferometry" Journal of the Optical Society of America A, vol. 17, No. 11 pp. 2061-2066 (Nov. 2000).

Choi, Y.B. and Kim, S. W., "Phase Shifting Grating Projection Moire Topography" Opt. Eng. 37, pp. 1005-1010 (1198).

Creath, K., "Phase-Measurement Interferometry Techniques" in Progress in Optics. vol. XXVI, E. Wolf. Ed. Elsevier Science Publishers, Amsterdam, pp. 349-393 (1988).

Cunningha, R. and Yakimovsky, Y., "A System for Extracting Three-Dimensional Measurement for a Stereo Pair of TV Camers" Computer Graphics and Image Processing, pp. 195-210 (Jul. 1978).

El-Hakim, S. F. Beraldin, J.=-A., and Blais, F., "A Comparative Evaluation of the Performance of Passive and Active 3-D Vision Systems" St. Petersburg Conference on Digital Photogrammetry, Proc. SPIE, 2646, pp. 14-25 (Jun. 1995).

Fang, Q., "Linearly Coded Profilometry With a Coding Light That Has Isosceles Triangle Teeth: Even-Number-Sample Decoding Method" Applied Optics, 36, pp. 1615-1620 (1997).

Fabg, Q. and Zheng, S., "Linearly Coded Profilometry" Appl. Opt. 36, pp. 2401-2407 (1997).

Frankowski G, Chen M, Huth T, "Real-Time 3D Shape Measurement With Digital Strip Projection by Texas Instruments Micromirro Devices DMD" Three-dimensional image capture and applications III, Corner BD, Nurre JH, eds, Proc SPIE, 2000; 3958: 90-105.

Freischlad, K., and Koliopoloulos, C., "Fourier Description of Digital Phasemeasuring Interferometry" Journal of the Optical Society of America A. vol. pp. 542-551 (1990).

Fujigaki, M. and Morimoto, Y., "Accuracy of Real-Time Shape Measurement by Phase-Shifting Grid Method Using Correlation" JSME International Journal, Series A, vol. 43, No. 4, pp. 314-320 (2000).

Geng, Z. J., "Rainbow 3-D Camera: New Concept of High-Speed Three Vision System" Opt. Eng., vol. 35, pp. 376-383 (1996).

Giovanna Sansoni, Marco Trebeschi and Franco Docchio, "Fast 3D Profilometer Based Upon the Projection of a Single Fringe Pattern and Absolute Calibration" Meas. Sci. Technol 17, pp. 1757-1766 (2006).

Goldstein, R.M., Zebker, H.A., and Werner, C.L., "Satellite Radar Interferometry: Two-Dimensional Phase Unwrapping" Radio Science, vol. 23, No. 4, pp. 713-720 (1988).

Gorecki, C., "Interferogram Analysis Using A Fourier Transform Method for Automatic 3D Surface Measurement" Pure Appl. Opt., vol. 1, pp. 103-110(1992).

Gray, S., "In Virtual Fashion" IEEE Spectrum, 35 (2), 18-25 (Feb. 1998).

Greivenkamp, J.E. and Bruning, J.H., "Optical Shop Testing" Chapter 4: Phase Shifting Interferometry, John Wiley and Sons, Inc., pp. 501-598 (1992).

Gu, J. and Chen, F., "Fast Fourier Transform, Iteration, and Least-Square-Fit Demodulation Image Processing for Analysis of Single-Carrier Fringe Pattern" Journal of the Optical Society of America A, vol. 12, pp. 2159-2164 (1995).

Guan, C., Hassebrook, L.G., and Lau, D.L. "Real-Time 3-D Data Acquisition for Augmented Reality Man and Machine Interfacing" Visualization of Temporal and Spatial Data for Civilian and Defense Applications V, SPIE's AeroSense, vol. 2097A-5 (2003).

Hall-Holt, O. and Rusinkiewicz, S., "Stripe Boundary Codes for Real-Time Structured-Light Range Scanning of Moving Objects" In Int. Conf. on Computer Vision, pp. 359-366 (2001).

Harding, K.G., "Phase Grating Using for Slop Discrimination in Moire Interferometry and its Application in Electronic Packaging" Opt. Eng. 37, pp. 1410-1419 (1998).

He, X.Y., Zou, D. Q., Liu S., and Guo Y. F., "Phase-Shifting Analysis in Moire Interferometry and its Application in Electronic Packaging" Opt. Eng. 37, pp. 1410-1419 (1998).

Horn, E. and Kiryati N., "Toward Optimal Structured Light Patterns" Image and Vision Computing, vol. 17(2), pp. 87-97 (Feb. 1999).

Hu, Q., Huang, P.S., Fe, Q., and Chang, F., "Calibration of a Three-Dimensional Shape Measurement System" Opt. Eng. 42(2), pp. 487-493 (2003).

Huang, P.S., Hu, Q., Jin F., and Chiang, F., "Color-Encoded Digital Fringe Projection Technique for High-Speed Three-Dimensional Surface Contouring" Opt. Eng. 38(6), pp. 1066-1071 (1999).

Hung, D.C.D., "3D Scene Modelling by Sinusoid Encoded Illumination" Image and Vision Computing, 11(5), pp. 51-256 (Jun. 1993).

Judge, T.R. and Bryanston-Cross, P.J., "A Review of Phase Unwrapping Techniques in Fringe Analysus" Optics and Lasers in Engineering, 21, pp. 199-239 (1994).

Kreis, T., "Digital Holographic Interference-Phase Measurement Using the Fourier Transform Method" Journal of the Optical Society of America A. vol. 3, pp. 847-855 (1986).

Li, W., Su. X, and Liu Z., "Large-Scale Three-Dimensional Object Measurement: A Practical Coordinate Mapping and Image Data-Patching Method" Applied Optics, vol. 40, No. 20, pp. 3326-3333 (Jul. 2001).

Liu, Hongyu, Bard, Benjamin, Lu, Guowen, and Wu, Shudong, "Absolute Measurement of Surface Profiles in Phase-Shifting Projected Fringe Profilometry" Porc. SPIE, vol. 3782, pp. 238-290 (Jul. 1999).

Liu, H., Su, W., Reichard, K., and Yin, Shizhuo, "Calibration-Based Phase-Shifting Projected Fringe Profilometry for Accurate Absolute 3D Surface Profile Measurement" Optics Communications, vol. 216, pp. 65-80 (2003).

Macy, W. w., "Two-Dimensional Fringe-Pattern Analysis" Appl. Opt. 22, pp. 3898-3901 (1983).

Mada, S., K., Smith, M. L., Smith, L.N., and Midha, S., "An Overview of Passive and Active Cision Techniques for Hand-Held 3D Data Acquisition" Proc. SPIE, vol. 4877, pp. 16-27 (2003).

Malcolm, A. and Burton, D., "The Relationship Between Fourier Fringe Analysis and the FFT" In Prypntniewicz R., ed.. Laser Interferometry IV: Computer-Aided Interferometry. Proc. Of Soc. Photo-Opt. Instr. Eng. 1553. pp. 286-297 (1991).

Marklund, O., "Noise-Insensitive Two-Dimensional Phase Unwrapping Method" J. Opt. Soc. Am. A, vol. 15, No. 1 (Jan. 1998).

Maruyama, M. and Abe, S., "Range Sending by Projection Multiple Slits With Random Cuts", IEEE Transaction On Pattern Analysis and Machine Intelligence, 15(6) pp. 647-650(1993).

Massa, J. Buller, G. Wlaker, A. Cova, S. Umasuthan, M., and Wallace, A., "Time of Flight Optical Ranging System Based on Time Corrected Single Photon Counting" Appl. Opt. 37(31), pp. 7298-7304 (1998).

Meadows, D. M., Johnson, W. O., and Allen, J. B., "Generation of Surface Contours by Moire Pattern" Appl. Opt. 9(4), pp. 942-947(1970).

Miyasaka, T. and Araki, K., "Development of Real Time 3-D Measurement System Using Intensity-Ratio Method" Proc. ISPRS Commission III, vol. 34, Part 3B, Phitigrammic Computer vision (PCV02), pp. 181-185, Graz (2002).

Morimotto, Y., Fujigaki, M., and Toda, H., "Real-Time Shape Measurement by Integrated Phase-Shifting Method" Proc. SPIE, vol. 3744, pp. 118-125 (Aug. 1999).

Moring, I., Ailisto, H., Koivunen, V,. and Myllyla, R., "Active 3-D Vision System for Automatic Model-Based Shape Inspection" Optics and Lasers in Engineering, vol. 10 (3-4), pp. 149-160 (1989).

Pages, J., Salvi, J., Garcia, R., and Matabosch, C., "Overview of Coded Light Projection Techniques for Automatic 3F Profiling" IEEE International Conference on Robotics and Automatic, ICRA 2003, pp. 133-138, Taipei, Taiwan, (Sep. 14-19, 2003).

Pan J., Huang, P.S., and Chiang, F.P., "Color Phase-Shifting Techniques for Three Dimensional Shape Measurement" Opt. Eng. 45 (1) 013602. pp. 1-9 (2006).

Parthasarathy, S., Birk, J., and Dessimoz, J., "Laser Rangefinder for Robot Control and Inspection" Robot Vision, SPIE, 336, pp. 2-11 (1982).

Popplestone, R.J., Brown, C.M., Ambler A.P., and Crawford, G.F., "Forming Models of Plane-and-Cylinder Faceted Bodies From Light Stripes" Proc. Int. Joint Conference on Artificial Intelligence, pp. 664-668 (1975).

Porter II, G.B. and Mundy, J. L., "Noncontact Profile Sensing System for Visual Inspection" Robot Vision, SPIE, 336, pp. 67-76 (1982).

Posedemer, J.L. and Altschuler, M.D., "Surface Measurement by Space Encoded Projected Beam Systems" Computer Graphics Image Processing, 18, pp. 1-17 (1982).

Proesmans, M., Van Gool, L., and Oosterlinck, A., "One-Shot Active 3D Shape Acquisition" in Int. Conf. On Pattern Recognition, pp. 336-340 (1996).

Quan, C., Tay, C.J., Kang, X., He, X. Y., and Shang, H.M., "Shape Measurement by Use of Liquid-Crystal Display Fringe Projection With Two-Step Phase Shifting" Applied Optics, vol. 42, No. 13 pp. 2329-2335 (2003).

Raskar, R., Welch, G., Cutts, M., Lake, A., Stesin, L., and Fuchs, H., "The Office of the Future: A Unified Approach to Image-Based Modeling and Spatially Immersive Displays" Computer Graphics, vol. 32, No. Annual Conference Series, pp. 179-188 (1998).

Reich, C., Ritter, R., and Thesing, J., 3-D Shape Measurement of Complex, (1998).

Rioux, M., "Laser Range Finder Based Upon Synchronous Scanners" Applied Optics 23(21), pp. 3837-3844(1984).

Sansoni, G., Corini, S., Lazzari, S., Rodella, R., and Docchio, F., "Three Dimensional Imaging Based on Gray-Code Light Projection: Characterization of the Measuring Algorithm and Development of a Measuring System for Industrial Application" Appl. Opt. 36, pp. 4463-4472 (1997).

Seitz, S.M., "An Overview of Passive Vision Techniques" in Siggraph 99 Course on 3D Photography (1999).

Shiou, F.J., Lin, Y.F., and Chang, K.H., "Determination of the Optimal Parameters for Freeform Surface Measurement and Data Processing in Reverse Engineering" The International Journal of Advanced Manufacturing Technology, vol. 21, No. 9, pp. 678-690(2003).

Sitnik, R., Kujawinska, M, and Woznicki, J., "Digital Fringe Projection System for Large-Volume 360-DEG Shape Measurement" Opt. Eng. 41(2), pp. 443-449(2002).

Su, X. and Chen, W., "Fourier Transform Profilometry: A Review" Optics and Lasers in Engineering, 35, pp. 263-284 (2001).

Takasahi, H., "Moire Topography" Applied Optics, vol. 9(6), pp. 1467-1472 (1970).

Winkelbach, S. and Wahl, F.M., "Shape From Single Stripe Pattern Illumination" Pattern Recognition, Lecture Notes in Computer Science 2449, pp. 240-247 Springer (2002).

Yuan, F., Song, D., and Zeng, L., "A Fringe Projection Method for Measuring 3D Profile and Position of a Moving Object" Proc. SPIE, vol. 4221, pp. 24-27 (2000).

Zhnag, L., Curless, B., and Seitz, S.M., "Spacetime Stereo: Shape Recovery for Dynamic Scenes" in proccedings of IEEE Computer Society Conference on Computer Vision and Pattern Recognition (CVPR), Madison, WI. pp. 367-374 (Jun. 2003).

Zhang, S., Royer, D., and Yau, S.T., "High-Resolution Real-Time 3-D Shape Measurement" Opt. Eng., vol. 45, No. 12 (2006).

Zhang, S., Rover, D. and Yau, S. T., "GPU-Assisted High-Resolution, Real-Time 3-D Shape Measurement" Opt. Express, vol. 14, pp. 9120-9129 (2006).

Zhang, L. and Nayar, S., "Projection Defocus Analysis for Scene Capture and Image Display" In ACM SIGGRAPH Annual Conference, Boston, MA (Aug. 2006).

Zhang, S. and Yau, S.T. "Generic Nonsinusoidal Phase Error Correction for Three-Dimensional Shape Measurement Using a Digital Video Projector" Appl. Opt., vol. 46, No. 1, pp. 36-43 (2007).

Zhang, S., Li, X. and Yau, S.T. "Multilevel Quality-Guided Phase Unwrapping Algorithm for Real-Time 3-D Shape Reconstruction" Appl. Opt. vol. 46, No. 1, pp. 50-57 (2007).

Zhou, W.S. and Su, X.Y., "A Direct Mapping Algorithm for Phase-Measuring Profilometry" Journal Of Modern Optics, vol. 41, No. 1, pp. 89-94 (1994).

Zum Brunn, R., "Automatic Fast Shape Determination of Diffuse Reflecting Objects at Close Range, by Means of Structured Light and Digital Phase Measurement" Proc. ISPRS Intercommission Conference on Fast Proc. Of Photogrammetric Data, Interlaken, Switzerland (1987).

Boehm, Jan, "Model-Based Segmentation and Recognition From Range Data" Institute for Photogrammetry.

Chen, F., Brown, G.M., and Song M., "Overview of Three-Dimensional Shape Measurement Using Optical Methods" Opt. Eng. 39 (1), pp. 10-22 (2000).

Chen L. and Quan C. Reply to Comment on "Fringe Projection Profilometry With Nonparallel Illumination: A Least-Squares Approach" Opt Lett 2006; 31(13): (1974-1975).

Chen, Lujie and Quan, Chenggen, "Reply to a Comment on Fringe Projection Profilometry and Non Parallel Illumination: A Least-Squares Approach" Optical Society of America, vol. 31, No. 13 (Jul. 1, 2006).

Coggrave, C.R. and Huntley, J.M., "High-Speed Surface Profilometer Based on a Spatial Light Modulator and Pipeline Image Processor" Opt. Eng. 38(9) pp. 1573-1581 (Sep. 1999).

Dinmin-Barkowski, Igor, Kim and Jae-Seon, "Influence of the Projected Grid Pattern Distortions on Measurement Accuracy for Phase Shift Based 3D Inspection" SPIE vol. 6051, 60510P, pp. 1-7 (2005).

Ganotra, Dinesh, Joseph, Joby and Singh, Kehar, "Profilometry for the Measurement if Three-Dimensional Object Shape Using Radial Basis Function, and Multi-Layer Perceptron Neural Networks" Optics Communications 209 pp. 291-309 (2002).

Guo, H., He. H., and Chen, M., "Gamma Correction for Digital Fringe Projection Profilometry" Applied Optics, vol. 43, No. 14, pp. 2906-2914 (2004).

Guo, H., He, H. Yu, Y., and Chen, M., "Least-Squares Calibration Method for Fringe Projection Profilmetry" Opt. Eng. 44(3), pp. 033603(1-9) (Mar. 2005).

Guo H, Chen M. and Zheng P, "Least-Squares Fitting of Carrier Phase Distributopm by Using a Rational Funcyion in Fringe Projection Profilometry" Opt Lett 2006;31(24): pp. 3588-3590.

Guo, Hongwei and Chen, Mingyi, "Multiview Connection Technique for 360-Deg Three-Dimensional Measurement" Opt. Eng. vol. 42(4) pp. 900-905 (Apr. 2003).

Halioua, M. and Liu, H.C. "Optical Three-Dimensional Sensing by Phase Measuring Profilometry" Optics and Lasers in Engineering, vol. 11(3) pp. 185-215 (1989).

He, Haitao, Chen, Mingyi, Guo, Hongwei and Yu, Yinjie, "Novel Multiview Connection Method Based on Virtual Cylinger for 3-D Surface Measyrement" Optical Engineering 44(8) (Aug. 2005).

Hettwer, Andrea, Kranz, Jochen, Schwider, Johannes, "Three-Channel Phase-Shifting Intererometer Using Polarization-Optics and a Diffraction Grating" Opt. Eng. vol. 39(4) pp. 960-966 (Apr. 2000).

Hu, Qingying J., Huang, P.S., and Chiang Fu-Pen, "Calibration of a Three-Dimensional Shape Measurement System" Opt. Eng. 42(2) pp. 487-493 (Feb. 2003).

Huang, P.S. and Chiang, F., "Recent Advances in Fringe Projection Technique for 3-D Shape Measurement" Proc. Of SPIE, vol. 3783, pp. 132-142 (1999).

Huang, P.S., and Chiang Fu-Pen, "Double Three-Step Phase-Shifting Algotithm" Applied Optics, vol. 41, No. 22, pp. 4503-4509 (2002).

Huang, Zhang, P.S., Zhang, C., and Chiang, F., High-Speed 3-D Shape Measurement Based on Digital Fringe Projectio Opt. Eng. 42(1) pp. 163-168 (2003).

Huang, P.S., Hu, Q., and Chiang, F., "Error Compensation for a Three-Dimensional Shape Measurement System" Opt. Eng. 42(2) pp. 482-486 (2003).

Huang, P.S., Zhang, S., and Chiang, F., "Trapezoidal Phase-Shifting Method for Three-Dimensional Shape Measurement" Opt. Eng. 44(12), 123601, pp. 1-8 (2005).

Huang, P.S., Zhang, S., Fast Thres-Tep Phase-Shifting Algorithm Appl. Opt. Vol. 45, No. 21, pp. 5086-5091 (2006).

Huang, Peisen S., and Xu, han, "On Improving the Accuracy of Structured Light System" SPIE vol. 6382, 63820H, pp. 1-8 (2006).

Huang, Peisen S., Zhang, Chengping, and Chiang, Fu-Pen, "Digital Fringe Projection Technique for High-Speed 3S Shape Measurement"SPIE vol. 4222 pp. 54-60 (2000).

Huang, Peisen S. Zhang, Song, "3-D Optical Measurement Using Phase Shifting Based Methods" SPIE vol. 6000, 600002 (2005).

Hung, Y.Y., Lin, L., Shang, H.M., and Park, B.G., "Practical Three-Dimensional Computer Vision Techniques for Full-Field Surface Measurement" Opt. eng. 39(1), pp. 143-149 (2000).

Huntley, J.M. and Coggrave, C.R., "Progress in Phase Unwrapping" Proc. SPIE, vol. 3407 (1998).

Huntley, J.M. and Coggrave, C.R., "Progress in Phase Unwrapping" Proc. SPIE, vol. 3407 (1998).

Jin, Lianhua, Kodera, Yutaka, Yoshizawa, Toru and Otani, Yukitoshi, "Shadow Moire Profilometry Using the Phase-Shifting Method" Opt. Eng. vol. 39(8), pp. 2119-2123 (Aug. 2000).

Jia, P., Kofman, J. and English, C., "Multiple-Step Triangular-Pattern Phase-Shifting and the Influence of Number of Steps and Pitch on Measurement Accuracy" Applied Optics, 46(16), pp. 3253-3262 (2007).

Jia, P., Kofman, J. and English, C. "Two-Step Traiangular-Pattern Phase-Shifting Method for Three-Dimensional Object-Shape Measurement" Optical Engineering (2007).

Jia, P., Kofman, J. and English, C. "Comparison of Linear and Non-linear Calibration Methods for Phase-Measuring Profilometry" Optical Engineering, 46(4), 043601, pp. 1-10 (2007).

Jia, P., Kofman, J. and English, C. "Real-Time Full-Field 3-D Surface-Shape Measurement Using Off-the-Shelf Components and a Single Processpr" IEEE 6th International Conference on 3-D digital Imaging and Modeling, Aug. 2007, Montreal, QC, Canada, (8 pages) (2007).

Jia, P., Kofman, J. and English, C. "Repeated Phase-Offset Measurement for Error Compensation in Two-Step Triangular Phase-Shifting Profilometry" in Optomechantronic Sensors, Instrumentation, and Computer-Vision Systems, Y. Takaya, J. Kofman. (Eds.) Proc International Society for Optical Engineering (SPIE) 6375, 6375D, pp. 1-8 (2006).

Jia, P., Kofman, J. and English, C. "Triangular Phase-Shifting Algorithms for Surface Measurement" in Optomechatronic Sensors, Instrumentation, and Computer-Vision Systems, Y. Takaya, J. Kofman, (Eds.) Proc International Society for Optical Engineering (SPIE) 6375, 63750C, pp. 1-12 (2006).

Jia, P., Kofman, J., English C. and Deslauriers, A. "Two-Step Triangular Phase-Shifting Method for 3-D Object-Shape Measurement" Optomechatronic Sensors and Instrumentation, International Society for Optical Engineering (SPIE) International Symposium on Optomechatronic Technologies (ISOT 2005), Sapporo, Japan, Dec. 2005, Pro SPIE 6049, pp. 141-150 (2005).

Jia, P., Kofman, J., English, C. and Deslauriers, A. "Comparison of Linear and Non-Linear Calibration Methods for Phase-Shifting Surface-Geometry Measurement" Optomechatronic Machine Vision, International Society of Optical Engineering (SPIE) International Symposium on Optomechatronic Technologies (ISOT 2005), Sapporo, Japan Dec. 2005. Proc SPIE 6051, 60510G, pp. 1-12 (2005).

Koninckx, T.P., Griesser, A., and Gool, L.V., "Real-Time Range Scanning of Deformable Surfaces by Adaptively Coded Structured Light" Fourth International Conference on 3-D Digital Imaging and Modeling-3DIM 2003, pp. 293-300 (Oct. 6-10, 2003).

Koninckx, T.P., Gool, L. V., "Real-Time Range Acquisition by Adaptive Structured Light" IEEE Transactions on Pattern Analysis and Machine Intelligence, vol. 28, No. 3, pp. 432-445 (Mar. 2006).

Kujawinska, M. and Wojciak, J. "Spatial-Carrier Phase Shifting Technique of Fringe Pattern Analysis" Industrial Applications of Holographic and Speckle Measuring Techniques, Proc. SPIE, 1508, pp. 61-57 (1991).

Langoju, Tajest, Patil, Anhijit and Rastogi, Pramod, "Real-Time Phase-Step Estimation in Phase-Shifting Interferometry" Optical Eng. vol. 46(3) (Mar. 21, 2007).

Legarda-Saenz, Ricardo, Bothe, Thorsten and Juptner, Werner P., "Accurate Procedure for the Calibration of a Structured Light System" Opt. Eng. vol. 43(2) pp. 464-471 (Feb. 2004).

Li, Wan-Song, Su, Xian-Yu, "Phase Unwrapping Algorithm Based on Phase Fitting Reliability in Structure Light Projection" Opt. Eng. vol. 41(6) pp. 1365-1372 (Jun. 2002).

Liao, Miao, Sun, Mingxuan and Yang, Ruigang, "Robust and Accurate Visual Echo Cancelation in a Full-Duplex Projector-Camera System" Center for Visualization and Virtual Environment, (2006).

Liu, Weiyi, Wang, Zhaoqi, Mu, Guoguang and Zhiliang Fang, "Color-Coded Projection Grating Method for Shape Measurement With a Single Exposure" Applied Optics/vol. 39, No. 20 (Jul. 10, 2007).

Pan, J., Huang, P.S., and Chiang, F., "Color-Encoded Digital Fringe Projection Technique for High-Speed 3D Shape Measurement Color Coupling and Imbalance Compensation" Two-and Three-dimensional vision systems for inspection, control, and metrology, Batchelor BG, Hugli H. eds, Proc SPIE, 5265: pp. 205-212 (2004).

Quan, C., He, X.Y., Wang, C.F., Tay, C.J. and Shang, H.M., "Shape Measurement of Small Objects Using LCD Fringe Projection With Phase Shifting" Optics communictions, vol. 189, pp. 21-29 (2001).

Quan, C. Tay, C.J. and Shang, H.M., "Fringe Projection Technique for the 3-D Shape Measurement of a Hydroformed Shell" Journal of Materials processing Technology, pp. 88-91, (1999).

Rusinkiewicz, S. Hall-Holt, O., and Levoy, M., "Real-Time 3D Model Acquisition" Proceedings of Siggraph, pp. 438-446 (Jul. 2002).

Salvi, J., Pages, J., and Batlle, J. "Pattern Codification Strategies in Structured Light Systems" Pattern Recognition. vol. 37, Issued 4, pp. 827-849 (Apr. 2007).

Servin, M., Rodriguez-Verz R.m Narroquin, J.L. and Malacara, D., "Phase-Shifting Interferometry Using a Two-Dimensional Regularized Phase-Tracking Technique" Journal of Modern Optics, vol. 45, No. 9, pp. 1809-1819 (1998).

Sivakumar, N.R., Hui, W.K. Venkatakrishnan, K. and Ngoi, B.K.A., "Large Surface Profile Measurement With Instantaneous Phase-Shifting Interferometry" Opt. Eng. vol. 42 (2) pp. 367-372 (Feb. 2003).

Su, Xianyu, Song, Wanzhong an Cao, Yiping, "Phase-Height Mapping and Coordinate Calibration Simultaneously in Phase-Measuring Profilometry" Opt. eng. vol. 43(3) pp. 70-715 (Mar. 2004).

Su, Xianyu, Cao, Yipinh, Xiangm Liqun, Chen, Wenjin and Zhang, Qican, "Three Dimension Digitization of Tooth With Structure Illumination" SPIE vol. 5254, pp. 253-256, (2003).

Su, Xianyu and Chen, Wenjing, "Reliability-Guiding Phase Unwrapping Algorithm: A Review" Optics and Lasers in Engineering 42, pp. 245-261 (2004).

Sansoi, Giovanna, trebeschi, Marco and Docchino, Franco, "Fast 3D Profilometer Based Upon the Projection of a Single Fringe Pattern and Absolute Calibration" 2006 IOP Publishing Ltd., pp. 1757-1766.
Takeda, M., and Muthoh, Kazuhio, "Fourier Transform Profilometry for the Automatic Measurement for 3-D Object Shapes" University of Electrocommunications, 1-5-1, pp. 3977-3982 (Aug. 9, 1983).
Tay, C.J., Quan, C., Wu, T. and Huang, Y.H., "Integrated Method for 3-D Rigid-Body Displacement Measurement Using Fringe Projection" Opt. Eng. 43(5) May 2004, pp. 1152-1159.
Tidd, Jeremy M., "Long Term Data Projector Display Technology and Performance Study Interim White Paper" pp. 1-68, (2005).
Vuylsteke, P. and Oosterlinck, A., "Range Image Acquisition With a Single Binary-Encoded Light Pattern" IEEE Transactions On Pattern Analysis and Machine Intelligence, vol. 12, No. 2, (1990).
Wang Z. and Bi H., Comment on "Fringe Projection Profilometry With Nonparallel Illumination: A Least-Squares Approach" Opt Lett 2006; 31(13): pp. 1972-1973.
Wang, Zhaoyang and Hua, Du, "Out-of-Plane Shape Determination in Generalized Fringe Projection Profilometry" Optics Express 12122 vol. 14, No. 25, (Dec. 11, 2006).
Wee, Kuek Hong, Ping, Shum, Chye, Tian Cher, and Jing, Lai Wenn, "Full-Field Surface Measurement Technique for Optical-Metrology Applications" SPIE vol. 4595 pp. 237-242(2001).
Wong, Andrew K.C., Niu, Peiyi and He, Xiang, "Fast Acquisition of Dense Depth Date by a New Structure Light Scheme" Computer Vision and Image Understanding pp. 398-422, (2004).
Wust, Clarence and Capson, David W., "Surface Profile Measurement Using Color Fringe Projection" Machine vision and applications, pp. 193-203 (1991).
Yoshizawa, Toru, Yamamoto, Masayuki and Wakayama, Toshitaka, "Inner Profile Measurement of Piper and Holes Using a Ring Beam Device" SPIE vol. 6382, pp. 1-6, (2006).
Yuan, Fan, Song, Deqiang and Zeng, Jijiang, "A Fringe Projection Method for Measuring 3D Profile and Position of a Moving Object" SPIE vol. 4221 pp. 24-27 (2000).
Zhang, L. Curless, B., and Seitz, S., "Rapid Shape Acquisition Using Color Structured Light and Multi-Pass Dynamic Programming" International Symposium on 3D Data Processing Visualization and Transmission, Padova, Italy, pp. 24-36 (Jun. 2002).
Zhang, C., Huang, P.S., and Chiang, F. "Microscopic Phase-Shifting Profilometry Based on Digital Micromirror Device Technology" Applied Optics, vol. 41, No. 28 pp. 5896-5904 (2002).
Zhang, S. and Huang, P.S., "High-Resolution, Real-Time 3D Shape Acquisition" In IEEE Workshop on real-time 3D sensors and their uses (joint with CVPR 04) Washington DC, MA, (2004).
Zhang, S. and Huang, P.S., "Phase Error Compensation for a 3-D Shape Measurement System Based on the Phase-Shifting Method" Optical Engineering 46(6) (Jun. 2007).
Zhang, S. and Yau, S.-T. "High-Resolution, Real-Time Absolute 3-D Coordinate Measurement Based on the Phase Shifting Method" Opt. Express, vol. 14 pp. 2644-2649 (2006).

Zhang, S. and Huang, P.S., "Novel Method for Structured Light System Calibration" Opt. Eng., vol. 45, No. 8, pp. 083601-1-083601-8 (2006).
Zhang, Zonghua, Zhang, David, Peng, Xiang and Xiaotang, Hu, "Color Texture Extraction From Fringe Image Based on Full-Field Projection" Opt. Eng. vol. 42 No. 7 (Jul. 2003).
Zhang, Z., Zhang, D. and Peng, X., "Performance Analysis of a 3D Full Field Sensor Based on Fringe Projection" Optics and Lasers in Engineering vol. 42, pp. 341-353 (2004).
Zhong, Xianghong, "Phase-Step Calibration Technique Based on a Two-Run-Times-Two-Frame Phase-Shift Method" Applied Optics, vol. 45, No. 35 pp. 8863-8869 (Dec. 10, 2006).
Jin, L., Li, D., and Lu, Z, "Improved Adaptive Spatial Distance Weighted Median Filter" Optical Engineering 46(3) (Mar. 2007).
Photogrammetric calibration and accuracy evaluation of a cross-pattern stripe projector Brenner C.; Böhm J.; Gühring J. Proc. SPIE, vol. 3641, 164 (1998); DOI:10.1117/12.333780; Online Publication Date: May 29, 2003; Conference Date: Thursday Jan. 28, 1999.
Novel calibration method for 3-D measurement system based on fringe projection Proc. SPIE, vol. 5852, 501 (2005); DOI:10.1117/12.621552; Online Publication Date: Jun. 3, 2005; Conference Date: Monday Nov. 29, 2004.
Dense 3D surface acquisition by structured light using off-the-shelf components Proc. SPIE, vol. 4309, 220 (2000); DOI:10.1117/12.410877; Online Publication Date: May 2, 2003; ; Conference Date: Monday Jan. 22, 2001.
3-D optical measurement using phase shifting based methods Proc. SPIE, vol. 6000, 600002 (2005); DOI:10.1117/12.631766; Online Publication Date: Nov. 7, 2005; Conference Date: Monday Oct. 24, 2005.
Intensity-ratio error compensation for triangular-pattern phase-shifting profilometry Peirong Jia, Jonathan Kofman, and Chad English; Posted Jul. 2, 2007 (Doc. ID 77025); Published Sep. 13, 2007.
Fringe pattern analysis methods: up-tp-date review Malgorzata Kujawinska and Wolfgang Osten Proc. SPIE 3407, 56 (1998) Fringe pattern analysis methods: up-to-date review Proc. SPIE, vol. 3407, 56 (1998); DOI:10.1117/12.323363; Online Publication Date: May 23, 2003; Conference Date: Monday Jun. 8, 1998.
Robust and Accurate Visual Echo Cancelation in a Full-Duplex Projector-Camera System Miao Liao; Mingxuan Sun; Ruigang Yang; Zhengyou Zhang Computer Vision and Pattern Recognition Workshop, 2006. CVPRW apos;06.; Jun. 17-22, 2006; pp. 10-10, Digital Object Identifier 10.1109/CVPRW.2006.170.
Shape and motion measurement of time-varying objects based on spatio-temporal image analysis for multimedia applications Proc. SPIE, vol. 4660, 382 (2002); DOI:10.1117/12.468054; Online Publication Date: Apr. 15, 2003; Conference Date: Monday Jan. 21, 2002.

* cited by examiner

FULL-FIELD THREE-DIMENSIONAL MEASUREMENT METHOD

FIELD OF THE INVENTION

The present invention relates to three-dimensional surface-geometry or shape measurement useful in building a digital or mathematical representation of an object or environment for which the geometry is unknown.

BACKGROUND OF THE INVENTION

Three-dimensional (3-D) surface-geometry or shape measurement is useful to build a digital or mathematical representation of an object or environment for which the geometry is unknown. One of the most widely used techniques to obtain the 3-D shape of an unknown object is using structured light. By projecting a known light pattern (stripe, grid, or more complex shape) onto an object, the 3-D coordinates of points on the object surface can be calculated by triangulation from images acquired from another direction. FIG. 1 illustrates this triangulation principle. In the example shown in FIG. 1, a laser line is projected onto a scanned object. The light is scattered from the object surface and the image of the curved line formed on the object is acquired by a camera located at an angle to the laser source. The angle and the position where the scattered light is sensed in the camera sensor array are related. The depth information can be computed from the distorted two-dimensional (2-D) image of the laser light along the detected profile, based on a calibration of the measurement system done earlier. In order to get full range (depth) information, the laser sheet, formed by projecting the laser line, has to be moved across the object or scene. Point-by-point (cf. Parthasarathy, S. et al., "Laser rangefinder for robot control and inspection", *Robot Vision, SPIE*, 336, pp. 2-11, 1982; and Rioux, M., "Laser range finder based upon synchronous scanners", *Applied Optics* 23(21), pp. 3837-3844, 1984) and line-by-line (cf. Popplestone, R. J. et al., "Forming models of plane-and-cylinder faceted bodies from light stripes", *Proc. Int. Joint Conf. on Artificial Intelligence*, pp. 664-668,1975; and Porter II, G. B. and Mundy, J. L., "Noncontact profile sensing system for visual inspection", *Robot Vision, SPIE*, 336, pp. 67-76, 1982) scanning use a scanning mechanism equipped with accurate position sensors. Furthermore, they are slow and not practical for real-time 3-D shape measurement.

Multiple-stripe methods speed up the data acquisition, but suffer from a correspondence problem (cf. Boyer, K. and Kak, A., "Color-encoded structured light for rapid active ranging", *IEEE Trans. Pattern Analysis and Machine Intelligence*, pp. 14-28, 1987; Chen, C. et al., "Range data acquisition using color structured lighting and stereo vision". *Image and Vision Computing*, Vol. 15, pp. 445-456, 1997; and Rusinkiewicz, S. et al., "Real-time 3D Model Acquisition", *Proceedings of Siggraph*, pp. 438-446, July 2002) of determining which light stripes in the image correspond with the light stripes actually formed on the object. The correspondence problem can be removed by projecting a multi-frame coded pattern, which carries information of the coordinates of the projected points, without considering geometrical constraints. The coded structured-light approach is an absolute measurement method that encodes all lines in the pattern from left to right, requiring only a small number of images to obtain a full depth-image.

A coded structured-light method called intensity-ratio depth sensing (cf. Carrihill, B. and Hummel, R., "Experiments with the intensity ratio depth sensor", *Computer Vision, Graphics and Image Processing*, vol. 32, pp. 337-358. Academic Press, 1985; and Miyasaka, T. and Araki, K., "Development of real time 3-D measurement system using intensity ratio method", *Proc. ISPRS Commission III*, Vol. 34, Part 3B, Photogrammetric Computer vision (PCV02), pp. 181-185, Graz, 2002) involves projecting two patterns, a linear grey-level pattern and a constant flat pattern, onto the object and capturing the image of the light pattern formed on the object surface.

An intensity ratio is calculated for every pixel between the two consecutive frames and the 3-D coordinates of each pixel are determined by triangulation. This method has the advantage of fast processing speed, but the accuracy is poor and the problem of ambiguity arises for measuring objects with discontinuous surface shape if the intensity-ratio ramp is repeated (cf. Chazan, G. and Kiryati, N., "Pyramidal intensity-ratio depth sensor", *Technical Report* 121, Center for Communication and Information Technologies, Department of Electrical Engineering, Technion, Haifa, Israel, October 1995) to reduce sensitivity to noise.

Full-field optical 3-D shape measurement techniques have been developed to acquire surface-geometry information over a region of a surface rather than just a point or line. Compared with other techniques, it has the benefit of fast measurement speed due to the fact that it does not use scanning to cover the whole object surface.

Moiré interferometry (cf. Takasaki, H., "Moiré topography", *Applied Optics*, Vol. 9(6), pp. 1467-1472, 1970 and fringe projection (cf. Creath, K., "Phase-measurement interferometry techniques", *Progress in Optics*, Vol. XXVI, E. Wolf, Ed. Elsevier Science Publishers, Amsterdam, pp. 349-393, 1988; Halioua, M. and Liu, H. C. "Optical Three-Dimensional Sensing by Phase Measuring Profilometry", *Optics and Lasers in Engineering*, Vol. 11(3), pp. 185-215, 1989; and Greivenkamp, J. E. and Bruning, J. H., *Optical Shop Testing*, Chapter 4: "Phase Shifting Interferometry", John Wiley and Sons, Inc., pp. 501-598, 1992) are good representatives of this technique which allows relatively simple image-processing algorithms to extract the 3-D coordinate information, high-speed image grabbing, reliable, quantitative surface measurements, as well as non-contact and noninvasive characteristics, and potential for real-time 3-D shape measurement.

The basis of the moiré method is that a grating pattern is projected onto an object. The projected fringes distort according to the shape of the object. The object surface, together with the projected fringes, is imaged through a grating structure called a reference grating as shown in FIG. 2. The image interferes with the reference grating to form moiré fringe patterns. The moiré fringe patterns contain information about the shape of the object. When the geometry of the measurement system is known, analysis of the patterns then gives accurate descriptions of changes in depth and hence the shape of the object.

Shadow moiré (cf. Takasaki, supra; Meadows, D. M. et al., "Generation of surface contours by moiré pattern" *Appl. Opt.* 9(4), pp. 942-947, 1970; and Chaing, F. P., "A shadow moiré method with two discrete sensitivities", *Exper. Mech.* 15(10), pp. 384-385 1975) is the simplest method of moiré technique for measuring 3-D shapes using a single grating placed in front of the object. The grating in front of the object produces a shadow on the object that is viewed from a different direction through the grating. One advantage of this method is that few or calculations are required to convert image data into profile information of the measured object.

The fringe projection technique discussed earlier, an alternative approach to the moiré method, uses a fringe or grating pattern that is projected onto an object surface and then viewed from another direction. The projected fringes or grating is distorted according to the topography of the object. Instead of using the moiré phenomenon, however, the 3-D surface is measured directly from the fringe projection by triangulation. The image intensity distribution of the deformed fringe pattern or grating is imaged into the plane of a CCD array, then sampled and processed to retrieve the phase distribution through phase extraction techniques, and finally the coordinates of the 3-D object is determined by triangulation.

To increase the measurement resolution, phase measuring interferometry techniques (cf. Takasaki, supra; Creath, supra; and Halioua, supra) have been implemented in moiré and fringe projection methods to extract phase information, among which phase-shifting methods (cf. He, X. Y., et al., "Phase-shifting analysis in moiré interferometry and its application in electronic packaging", *Opt. Eng.* 37, pp. 1410-1419, 1998; and Choi, Y. B. and Kim, S. W., "Phase-shifting grating projection moiré topography", *Opt. Eng.* 37, pp. 1005-1010, 1998) are the most widely used.

The principle of this technique is that periodic fringe patterns are projected onto an object surface and then viewed from another direction. In general, the minimum number of measurements of the interferogram that will permit reconstruction of the unknown phase distribution is three (cf. Creath, supra), and a sinusoidal fringe pattern is usually used in this technique.

Traditional phase-shifting systems use hardware such as a piezoelectric transducer to produce continuous as well as discrete phase shifts (cf. Creath, supra). In these cases, the accuracy of the extracted phase is limited by the accuracy of the mechanical shifting process. The accuracy also depends on the number of images. More phase steps usually can generate higher accuracy in 3-D shape reconstruction. The trade-off, however, is that longer time is involved both in image acquisition and processing, which is fairly limited for real-time analysis.

Another phase measurement technique is using Fourier transform analysis (cf. Takeda, M., et al., "Fourier Transform Method of Fringe Pattern Analysis for Computer Based Topography and Interferometry", *Journal Opt. Soc. of Am.*, 72, pp. 156-160, 1982; Kreis, T., "Digital holographic interference-phase measurement using the Fourier transform method", *Journal of the Optical Society of America A*. Vol. 3, pp. 847-855, 1986; Freischlad, K. and Koliopoloulos, C., "Fourier description of digital phasemeasuring interferometry," *Journal of the Optical Society of America A*. Vol. 7, pp. 542-551, 1990; Malcolm, A. and Burton, D., "The relationship between Fourier fringe analysis and the FFT," Prypntniewicz R., ed., *Laser Interferometry IV: Computer-Aided Interferometry. Proc. of Soc. Photo-Opt. Instr. Eng.* 1553. pp. 286-297, 1991; Gorecki, C., "Interferogram analysis using a Fourier transform method for automatic 3D surface measurement", *Pure Appl. Opt.*, Vol. 1, pp. 103-110, 1992; Gu, J. and Chen, F., "Fast Fourier transform, iteration, and least-squares-fit demodulation image processing for analysis of single-carrier fringe pattern", *Journal of the Optical Society of America A*, Vol. 12, pp. 2159-2164, 1995; and Su, X. and Chen, W., "Fourier transform profilometry: a review", *Optics and Lasers in Engineering*, 35, pp. 263-284, 2001).

In this method, only one deformed fringe pattern image is used to retrieve the phase distribution. In order to separate the pure phase information in the frequency domain, the Fourier transform usually uses carrier fringes; this poses difficulty in practice in trying to accurately control the frequency of the carrier fringe. Another significant limitation of the Fourier transform technique is its inability to handle discontinuities. Moreover, the complicated mathematical calculation of Fourier transforms is computationally intensive and makes the technique unsuitable for high-speed 3-D shape measurement.

The phase distribution obtained by applying a phase-shifting algorithm is wrapped into the range 0 to 2Π, due to its arctangent feature. A phase unwrapping process (cf. Macy, W. W., "Two-dimensional fringe-pattern analysis", *Appl. Opt.* 22, pp. 3898-3901, 1983; Goldstein, R. M. et al., "Satellite Radar Interferometry: Two-Dimensional Phase Unwrapping", *Radio Science*, Vol. 23, No. 4, pp. 713-720, 1988; Judge, T. R. and Bryanston-Cross, P. J., "A review of phase unwrapping techniques in fringe analysis", *Optics and Lasers in Engineering*, 21, pp. 199-239, 1994; Huntley, J. M. and Coggrave, C. R., "Progress in Phase Unwrapping", *Proc. SPIE* Vol. 3407, 1998; and Ghiglia, D. C. and Pritt, M. D., *Two-Dimensional Phase Unwrapping: Theory, Algorithms, and Software*, Wiley-Interscience, John Wiley and Sons, Inc., 1998) converts the modulo 2Πphase data into its natural range, which is a continuous representation of the phase map. This measured phase map contains the height information of the 3-D object surface (cf. Halioua, supra).

Therefore, a phase-to-height conversion algorithm is usually applied to retrieve the 3-D data of the object. This algorithm is usually related to not only the system setup, but also the relationship between the phase distribution and the height of the object surface. Based on geometric analysis of the measurement system, several phase-to-height mapping techniques (cf. Zhou, W. S. and Su, X. Y., "A direct mapping algorithm for phase-measuring profilometry", *Journal of Modern Optics*, Vol. 41, No. 1, pp. 89-94, 1994; Chen, X. et al., "Phase-shift calibration algorithm for phase-shifting interferometry", *Journal of the Optical Society of America A*, Vol. 17, No. 11, pp. 2061-2066, November, 2000; Liu, H. et al., "Calibration-based phase-shifting projected fringe profilometry for accurate absolute 3D surface profile measurement", *Optics Communications*, Vol. 216, pp. 65-80, 2003; Li, W. et al., "Large-scale three-dimensional object measurement: a practical coordinate mapping and image data-patching method", *Applied Optics*, Vol. 40, No. 20, pp. 3326-3333, July, 2001; Guo, H. et al., "Least-squares calibration method for fringe projection profilometry", *Opt. Eng.* 44(3), pp. 033603(1-9), March, 2005; and Sitnik, R. et al., "Digital fringe projection system for large-volume 360-deg shape measurement", *Opt. Eng.* 41 (2), pp. 443-449, 2002) have been developed, all focused on the accuracy of the measurement. Algorithms that emphasize the speed (cf. Hung, Y. Y. et al., "Practical three-dimensional computer vision techniques for full-field surface measurement", *Opt. Eng.* 39 (1), pp. 143-149, 2000; and Zhang, C. et al., "Microscopic phase-shifting profilometry based on digital micromirror device technology", *Applied Optics, Vol.* 41, No. 28, pp. 5896-5904, 2002) are also used in some high-speed or real-time systems (cf. Huang, P. S. et al., "High-speed 3-D shape measurement based on digital fringe projection", *Opt. Eng.* 42 (1), pp. 163-168, 2003 ("Huang No. 1"); and Zhang, S. and Huang, P. S., "High-resolution, Real-time 3D Shape Acquisition", *IEEE Workshop on real-time 3D sensors and their uses (joint with CVPR* 04), Washington D.C., MA, 2004).

More recently, a new digital fringe projection technique for 3-D surface reconstruction has been developed using high-resolution programmable projectors. Compared to traditional fringe projection and laser-interferometric fringe-projection techniques, the computer-generated fringe projection technique has many advantages: (1) any high quality fringe pattern can be precisely and quickly generated by software; (2) the fringe pitch can be easily modified to match the object surface, thus optimizing the range measurement of the object;

(3) the phase can be shifted precisely by software according to the specific algorithm without a physical phase shifter; (4) the use of a high and constant brightness and high contrast-ratio projector improves the accuracy of the 3-D shape measurement; and (5) with proper synchronization between the projection and image acquisition, real-time 3-D reconstruction could be achieved.

The most popular methods for computer-generated fringe projection with phase-shifting technique can be roughly divided into grey-scale phase-shifting (cf. Hung, supra; Huang, P. S. and Chiang, F., "Recent advances in fringe projection technique for 3-D shape measurement", *Proc. SPIE*, Vol. 3783, pp. 132-142, 1999 ("Huang No. 1"); Fujigaki, M. and Morimoto, Y., "Accuracy of real-time shape measurement by phase-shifting grid method using correlation", *JSME International Journal*, Series A, Vol. 43, No. 4, pp. 314-320, 2000; Hu, Q. et al., "Calibration of a three-dimensional shape measurement system", *Opt. Eng.* 42(2), pp. 487-493, 2003; Quan, C. et al., "Shape measurement of small objects using LCD fringe projection with phase shifting", *Optics Communications*, Vol. 189, pp. 21-29, 2001 and Quan, C. et al., "Shape Measurement by Use of Liquid-Crystal Display Fringe Projection with Two-Step Phase Shifting", *Applied Optics*, Vol. 42, No. 13, pp. 2329-2335, 2003 ("Quan No. 2")), color-encoded phase-shifting (cf. Huang, P. S. et al., "Color-encoded digital fringe projection technique for high-speed three-dimensional surface contouring", Opt. Eng. 38(6), pp. 1066-1071, 1999; and Pan, J. et al., "Color-encoded digital fringe projection technique for high-speed 3D shape measurement-color coupling and imbalance compensation", *Proc. SPIE*, Vol. 5265, pp. 205-212, 2004)[46,47] and fringe projection based on the Digital Micromirror Device (DMD) method (cf. Zhang, C., supra; Huang No. 1, supra; Huang, P. S., and Chiang, F. "Method and apparatus for three dimensional surface contouring using a digital video projection system", U.S. Pat. No. 6,438,272, Aug. 20, 2002; and Huang, P. S. et al., "Method and apparatus for three dimensional surface contouring and ranging using a digital video projection system", U.S. Pat. No. 6,788,210, Sep. 7, 2004).

The grey-scale phase-shifting method projects a series of phase-shifted sinusoidal grey-scale fringe patterns onto an object and then a camera from another direction captures the images of the perturbed fringe pattern sequentially for processing. Because the phase map acquired directly is limited from −Π to Π, the natural phase distribution of the pixels, which carries the 3-D surface information, is generated by applying phase unwrapping techniques. The 3-D shape information for each pixel is extracted by use of a phase-to-height conversion algorithm. This approach can potentially increase the measurement speed.

Instead of projecting a sinusoidal fringe pattern, Morimoto, Y. et al., "Real-time Shape Measurement by Integrated Phase-Shifting Method" *Proc SPIE*, Vol. 3744, pp. 118-125, August 1999[50] and Fujigaki, supra, have proposed an integrated phase-shifting method which projects a rectangular grey-scale pattern multiplied by two weighting functions, respectively. Morimoto built a signal processing board for real-time phase analysis. The system, which records four frames of the deformed grating on the object during one cycle of the phase shift, can obtain the phase distribution every 1/30 seconds. In Fujigaki's method, thirty-two phase-shifted grey-scale images with rectangular distribution are projected and captured to determine the phase difference that corresponds to the height distribution of the object. In the case of worst focus the average phase error is 3% and the maximum phase error is 5% when the object is stable. For a moving object, the error increases linearly with the phase-shifting aberration ratio.

For phase-shifting techniques, sequentially projecting and grabbing images consume time especially for more phase-shift procedures. To further increase the measurement speed, unlike conventional sinusoidal phase-shifting, which uses a minimum of three phase-shifted fringe patterns, a two-step sinusoidal phase-shifting method (cf. Quan No. 2, supra; and Almazan-Cuéllar, S. and Malacara-Hernandez, D., "Two-step phase-shifting algorithm", *Opt. Eng.*, 42(12), pp. 3524-3531, 2003) and one-frame spatial-carrier sinusoidal phase-shifting method (cf. Kujawinska, M. and Wojciak, J., "Spatial-carrier phase shifting technique of fringe pattern analysis," *Industrial Applications of Holographic and Speckle Measuring Techniques, Proc. SPIE*, 1508, pp. 61-67, 1991) for calculation of the phase values has been proposed. Because the phase unwrapping is carried out by use of an arccosine function for two-step sinusoidal phase-shifting, or arctangent function two times for spatial-carrier sinusoidal phase-shifting, the use of these algorithms simplifies the optical system and speeds up the measurement compared to the three-step sinusoidal phase-shifting method. However, the drawback of this method is that the measurement accuracy is lower because the accuracy is dependent on the number of images (of Huzug No. 1, supra; and Morimoto, supra).

The color-encoded method uses a Digital Light Processor (DLP)/Liquid Crystal Display (LCD) projector to project a color-encoded pattern onto the object. Only a single image, which integrates three phase-shifted images (RGB components), is captured by a color CCD camera. The image is then separated into its RGB components, which creates three phase-shifted grey-scale images. These images are used to reconstruct the 3-D object. The problems for this technique include overlapping between the spectra of red, green and blue channels of the color cameras that make the separation of RGB components difficult and intensity imbalance between the separated images of the red, green and blue fringe patterns. The effective separation of the captured image into its RGB components to create three phase-shifted images of the object and compensate the imbalance is non-trivial for this technique.

Fringe projection based on DMD projects a color-encoded fringe pattern onto the object using a DLP projector. Due to the particular features of the DLP projector, the RGB color channels are sequentially projected. With removal of the color filter of the DLP projector and the synchronization between the projection and image acquisition, three grey-scale phase-shifted images are obtained with high speed (cf. Zhang, C., supra, Huang No. 1, supra; and Zhang, S., supra). The 3-D shape of the object is reconstructed using a phase wrapping and unwrapping algorithm and a phase-to-height conversion algorithm. Considering that traditional sinusoidal phase-shifting algorithms involve the calculation of an arctangent function to obtain the phase, which results in slow measurement speed, an improved method, called trapezoidal phase-shifting method (cf. Zhang, S., supra) was proposed for further increasing the processing speed. By projecting three phase-shifted trapezoidal patterns, the intensity ratio at each pixel is calculated instead of the phase. This requires much less processing time.

In fringe-projection techniques, the projected pattern greatly affects the performance. Much processing time is spent on the phase calculation and phase-to-height conversion. To realize real-time 3-D shape measurement, it is not sufficient just to speed up the projection and image acquisition. Designing efficient patterns for fast manipulation are efficient ways of speeding up the entire 3-D measurement process.

The present invention therefore seeks to provide a novel full-field fringe-projection method for 3-D surface-geometry measurement, which is based on digital fringe-projection, intensity ratio, and phase-shifting techniques, and which uses new patterns for fast manipulation to speed up the entire 3-D measurement process.

SUMMARY OF INVENTION

The present invention provides a full-field fringe-projection method for 3-D surface-geometry measurement, referred to herein as "triangular-pattern phase-shifting". The inventive method is based on two-step phase-shifting, but can also be extended for multiple-step phase shifting. The inventive method is based on digital fringe-projection, intensity ratio, and phase-shifting techniques, discussed above.

In this method, a triangular grey-scale-level-coded fringe pattern, generated by computer using software, is projected along a first direction onto an object or scene surface via a video projector; the projected triangular fringe pattern is distorted according to the geometry of the surface; the 3-D coordinates of points on the surface are calculated by triangulation from distorted triangular fringe-pattern images acquired by a CCD camera along a second direction. The 3-D object may be reconstructed using only two triangular patterns, which are relatively phase-shifted by half of the pitch. A triangular-shape intensity-ratio distribution is obtained from calculation of the two captured distorted triangular fringe-pattern images.

Removal of the triangular shape of the intensity ratio over each pattern pitch generates a wrapped intensity-ratio distribution. The unwrapped intensity-ratio distribution is obtained by removing the discontinuity of the wrapped image with a modified unwrapping method such as is used in the sinusoidal phase-shifting method. An intensity ratio-to-height conversion algorithm, which is based on a phase-to-height conversion algorithm in the sinusoidal phase-shifting method, is used to reconstruct the 3-D surface coordinates of the object.

The present invention seeks to solve problems, with existing 3-D surface-shape measurement, that occur in respect of speed of measurement, ambiguity in determining correspondence between patterns and the real object or scene surface when repeated patterns are used, and in depth resolution. The inventive two-step triangular-pattern phase-shifting method for 3-D surface-shape measurement presents a new efficient intensity-ratio generation algorithm, which provides faster processing speed for generating 3-D coordinates of an object or scene surface with simpler computation and fewer images required. It improves the depth resolution and has a lower degree of ambiguity problems with the triangular patterns used.

The two-step triangular-pattern phase-shifting for 3-D surface-geometry measurement combines the advantages of conventional sinusoidal phase-shifting method and conventional intensity ratio methods and only uses two triangular patterns relatively phase-shifted by half of the pitch to reconstruct the 3-D surface. Compared with the conventional sinusoidal phase shifting and trapezoidal phase shifting methods, the inventive method has faster processing speed because of the simple computation of the intensity ratio and because fewer images are used to obtain the intensity ratio. It also has a better depth resolution compared to conventional intensity-ratio based methods and a lower degree of ambiguity problems when the intensity ratio ramp is repeated to reduce sensitivity to noise. The inventive method therefore has the potential for faster real-time 3-D surface measurement.

According to a first broad aspect of an embodiment of the present invention there is disclosed a fringe light projection method for use with a system for measuring three-dimensional surface-geometry of an object comprising steps of:

a) projecting a first triangular coded fringe pattern onto a surface of the object at a specified pitch and along a first direction to produce a first distorted fringe pattern on the object surface;

b) capturing, from along a second direction from the projected triangular coded fringe pattern, a first fringe-pattern image of the first distorted fringe pattern;

c) projecting at least one additional triangular coded fringe pattern onto a surface of the object at the specified pitch having a phase step relative to each other triangular coded fringe pattern and along the first direction to produce a corresponding at least one additional distorted fringe pattern on the object surface;

d) capturing, from along the second direction from the projected triangular coded fringe pattern, at least one additional fringe pattern image corresponding to the at least one additional distorted fringe pattern;

e) calculating a distribution of intensity ratios based on the first and the at least one additional fringe-pattern image; and f) calculating a height distribution relative to a pre-determined reference plane, whereby the three-dimensional surface geometry of the object may be determined.

According to a second broad aspect of an embodiment of the present invention there is disclosed a computer-readable medium in a fringe light projection system for measuring three-dimensional surface-geometry of an object, the medium having stored thereon, computer-readable and computer-executable instructions, which, when executed by a processor, cause the processor to perform steps comprising:

a) projecting a first triangular coded fringe pattern onto a surface of the object at a specified pitch and along a first direction to produce a first distorted fringe pattern on the object surface;

b) capturing, from along a second direction from the projected triangular coded fringe pattern, a first fringe-pattern image of the first distorted fringe pattern;

c) projecting at least one additional triangular coded fringe pattern onto a surface of the object at the specified pitch having a phase step relative to each other triangular coded fringe pattern and along the first direction to produce a corresponding at least one additional distorted fringe pattern on the object surface;

d) capturing, from along the second direction from the projected triangular coded fringe pattern, at least one additional fringe pattern image corresponding to the at least one additional distorted fringe pattern;

e) calculating an intensity ratio distribution based on the first and the at least one additional fringe-pattern image; and f) calculating a height distribution relative to a pre-determined reference plane, whereby the three-dimensional surface geometry of the object may be determined.

According to a third broad aspect of an embodiment of the present invention there is disclosed a fringe light projection system for measuring three-dimensional geometry of an object comprising:

a projector for projecting a plurality of triangular coded fringe patterns relatively spaced-apart by a phase step onto a surface of the object at a specific pitch and along a first direction to produce a plurality of distorted fringe patterns;

an image captor for capturing, along a second direction from the projected triangular coded fringe patterns, a plurality of corresponding fringe-pattern images of each distorted fringe pattern;

an intensity ratio generator for calculating an intensity ratio distribution based on all captured images; and a height distribution calculator for calculating a height distribution relative to a pre-determined reference plane based on the intensity ratio distribution, to thus determine the three-dimensional surface geometry of the object.

BRIEF DESCRIPTION OF THE DRAWINGS

The present invention will now be described with reference to the drawings in which.

DETAILED DESCRIPTION OF THE INVENTION

The present invention will be described for the purposes of illustration only in connection with certain embodiments. However, it is to be understood that other objects and advantages of the present invention will be made apparent by the following description of the drawings according to the present invention. While a preferred embodiment is disclosed, this is not intended to be limiting. Rather, the general principles set forth herein are considered to be merely illustrative of the scope of the present invention and it is to be further understood that numerous changes may be made without straying from the scope of the present invention.

Figure 1:
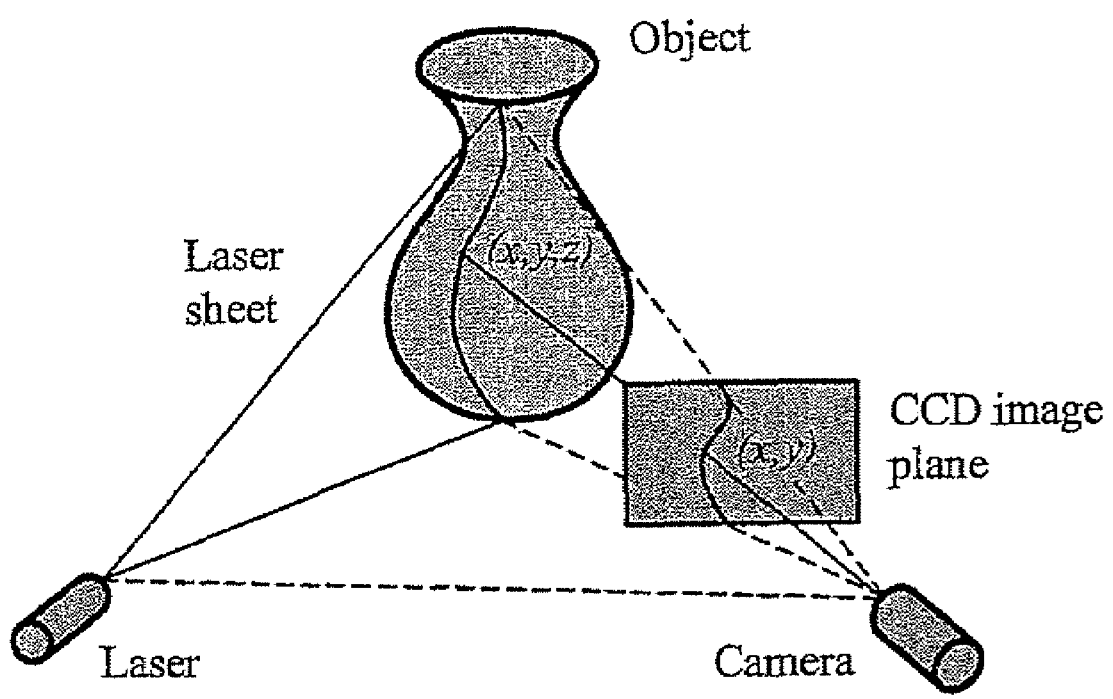
FIG. 1 illustrates the principle of a prior art laser triangulation measurement system.
Figure 2:
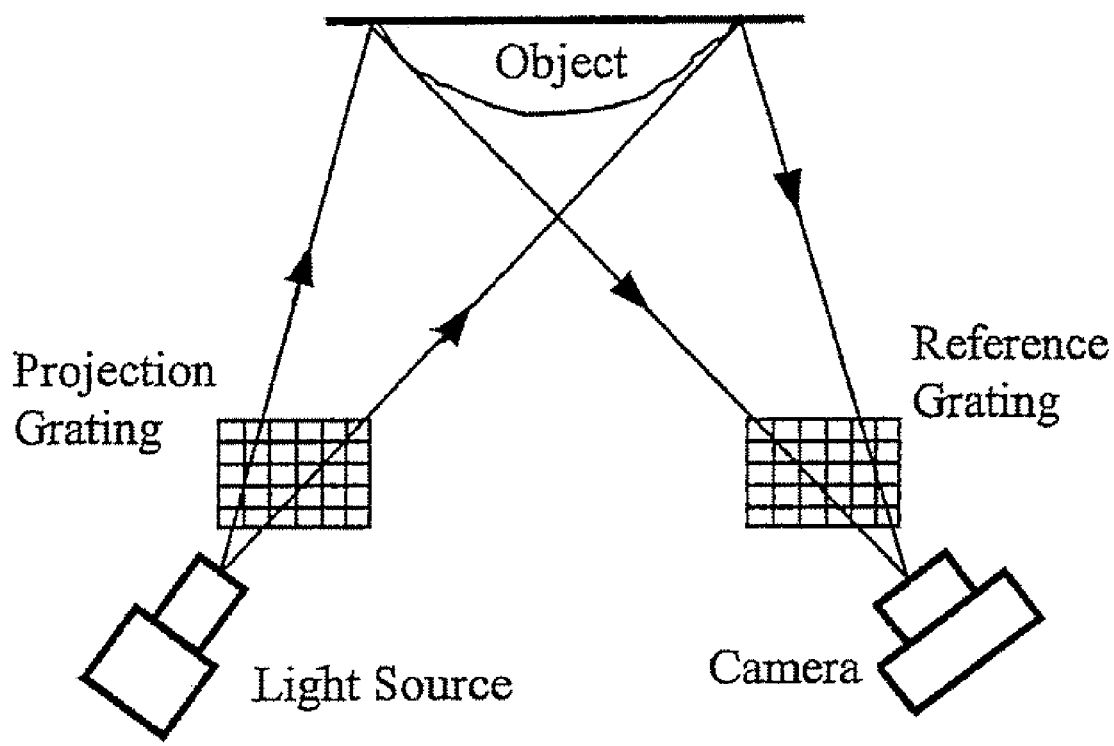
FIG. 2 is an optical setup for a prior art moiré projection system.
Figure 3:
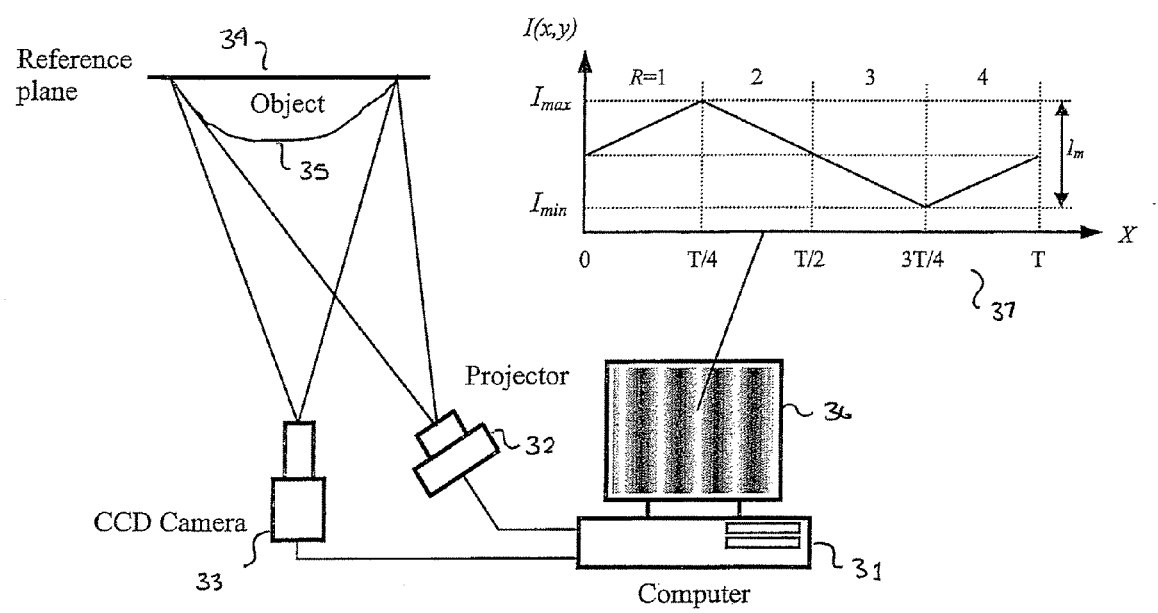
FIG. 3 is a schematic diagram of a 3-D measurement apparatus based on triangular phase-shifting fringe-projection according to an embodiment of the present invention.

Referring now to FIG. 3, there is shown a simple schematic diagram of the inventive triangular phase-shifting fringe-projection measurement apparatus, shown generally at 30. It consists of a computer 31, a video projector 32, a CCD camera 33, and a flat reference plane 34 for calibration. The projector 32 is used to project a triangular fringe pattern, digitally generated by software in the computer 33, onto the surface of an object 35. The CCD camera 33 is used to capture the image contour of fringe patterns via a frame grabber (not shown). The image is processed and a reconstructed 3-D shape 37 is displayed on the monitor 36.

The measurement apparatus 30 used to demonstrate the invention is now described, although alternative components or those with different specifications may be alternatively used. The computer 31 preferably has a 3.04 GHz processor with 1.0 GB memory. The digital projection system 32, which is preferably a model LP600 manufactured by In Focus preferably has a brightness of 2000 ANSI lumens, a resolution of XGA 1024×768, and a contrast ratio of 1000:1. The CCD camera 33, which may be a model XCHR50 Progressive Scan Black-and-White CCD Camera by Sony Corporation is used for image capture. Preferably, it delivers detailed images with an equivalent VGA resolution of 648×494 pixels. The CCD has square pixels, avoiding any aspect-ratio conversion. The frame grabber (not shown) may be a model Odyssey XA vision processor board by Matrox and is used to capture and digitize the images. Those having ordinary skill in this art will readily appreciate that there may be techniques that capture images without a framegrabber, such as imaging with a firewire camera-computer interface, that may be equally suitable.

In an exemplary scenario, a plastic face-mask was used as the object 35. The mask had dimensions of 210 mm×140 mm×70 mm.

Custom software in the inventive 3-D measurement apparatus was developed with Visual C++ 6.0.

Triangular fringe patterns are generated by computer 31 and projected onto the object 35 by the projector 32. The patterns are shifted digitally with the different phase steps, and the camera 33 captures the images of the object 35 via the frame grabber not shown).

The computer 31 also generates intensity-ratio wrapping, intensity ratio unwrapping, intensity-ratio difference, and object-height calculations using calibration parameters obtained in a prior calibration exerciase. The software also provides capability to display a reconstructed 3-D object in shaded, solid or wireframe modes. Median and averaging filters, and indeed, other computer vision filters known in the art may be applied to reduce noise and smooth the reconstructed 3-D object surface.

The use of conventional sinusoidal phase-shifting provides satisfactory measurement accuracy. However, calculation of the arctangent function is time consuming and slows down measurement speed. By contrast, the conventional intensity-ratio method has the advantage of fast processing speed, but may introduce ambiguity when measuring objects with discontinuous surface shape if the intensity-ratio ramp is repeated to reduce noise sensitivity In the present invention, a novel high-speed two-step triangular-pattern phase-shifting for 3-D shape measurement combines these conventional methodologies in an innovative fashion to appropriate the relative advantages of each prior art method.

Figure 4:
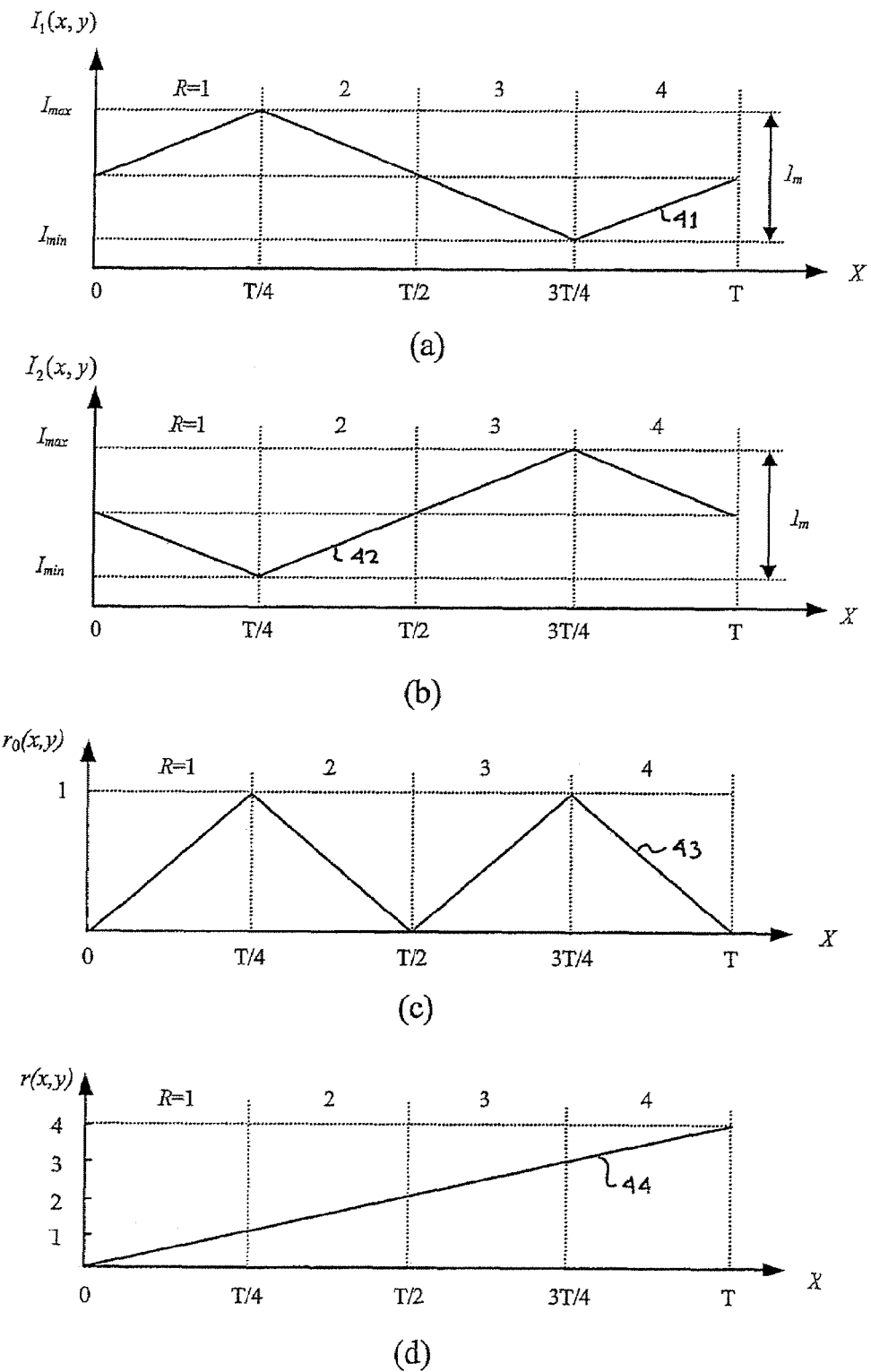
FIGS. 4(a) and (b) graphically illustrate phase-shifted input triangular fringe patterns for use in two-step triangular-pattern phase-shifting in accordance with an embodiment of the present invention.
FIG. 4(c) graphically illustrates an intensity ratio arising from application of the 3-D measurement apparatus of FIG. 3 to the patterns of FIGS. 4(a) and (b)
FIG. 4(d) graphically illustrates an intensity-ratio ramp according to an embodiment of the present invention.

Two triangular patterns 41, 42, relatively phase-shifted by half of the pitch, shown in FIGS. 4(*a*) and (*b*) respectively, are used to reconstruct the 3-D object in the inventive method.

The intensity equations for the two shifted triangular patterns may be formulated as follows:

$$I_1(x, y) = \begin{cases} \frac{2I_m(x, y)}{T}x + I_{\min}(x, y) + \frac{I_m(x, y)}{2} & x \in \left[0, \frac{T}{4}\right) \\ \frac{2I_m(x, y)}{T}x + I_{\min}(x, y) + \frac{3I_m(x, y)}{2} & x \in \left[\frac{T}{4}, \frac{3T}{4}\right) \\ \frac{2I_m(x, y)}{T}x + I_{\min}(x, y) - \frac{3I_m(x, y)}{2} & x \in \left[\frac{3T}{4}, T\right) \end{cases} \quad (1)$$

$$I_2(x, y) = \begin{cases} -\frac{2I_m(x, y)}{T}x + I_{\min}(x, y) + \frac{I_m(x, y)}{2} & x \in \left[0, \frac{T}{4}\right) \\ \frac{2I_m(x, y)}{T}x + I_{\min}(x, y) - \frac{I_m(x, y)}{2} & x \in \left[\frac{T}{4}, \frac{3T}{4}\right) \\ -\frac{2I_m(x, y)}{T}x + I_{\min}(x, y) + \frac{5I_m(x, y)}{2} & x \in \left[\frac{3T}{4}, T\right) \end{cases} \quad (2)$$

$$I_m(x, y) = I_{\max}(x, y) - I_{\min}(x, y) \quad (3)$$

where $I_1(x,y)$ and $I_2(x,y)$ are the intensities for the two shifted triangular patterns respectively, T is the pitch of the patterns, $I_m(x, y)$ is the intensity modulation, and $I_{\min}(x,y)$ and $I_{\max}(x,y)$ are the minimum and maximum intensities of the two triangular patterns, respectively.

The intensity ratio $r_0(x,y)$ may be calculated by:

$$r_0(x, y) = \frac{|I_1(x, y) - I_2(x, y)|}{I_m(x, y)} \quad (4)$$

After operation of Equation (4), the triangular patterns are each divided into four regions R=1 through 4. Each region has a different intensity ratio. The shape of the intensity ratio $r_0(x,y)$ 43 in the full pitch is shown in FIG. 4(*c*), which has a triangular shape whose values range from 0 to 1. This triangular shape can be converted to a ramp by applying the following equation:

$$r(x, y) = 2 \times \text{round}\left(\frac{R-1}{2}\right) + (-1)^{R+1}r_0(x, y) \quad (5)$$

$$R = 1, 2, 3, 4$$

where R is the region number.

The converted intensity-ratio ramp map r(x,y) 44, shown in FIG. 4(*d*), has the intensity value ranging from 0 to 4.

To generalize two-step triangular-pattern phase-shifting to N-step triangular-pattern phase-shifting the triangular fringe patterns can be generated using the following equation:

$$I_i(x, y) = \begin{cases} \frac{2I_m(x, y)}{T}(x + \delta_i) + I_{\min}(x, y) + \frac{I_m(x, y)}{2} & x + \delta_i \in \left[0, \frac{T}{4}\right) \\ -\frac{2I_m(x, y)}{T}(x + \delta_i) + I_{\min}(x, y) + \frac{3I_m(x, y)}{2} & x + \delta_i \in \left[\frac{T}{4}, \frac{3T}{4}\right) \\ \frac{2I_m(x, y)}{T}(x + \delta_i) + I_{\min}(x, y) - \frac{3I_m(x, y)}{2} & x + \delta_i \in \left[\frac{3T}{4}, T\right) \end{cases} \quad (6)$$

where $I_i(x,y)$ is the intensity value of the ith phase shift at pixel (x,y);

$\delta_i$ is the ith phase shift distance in the X direction.

To retrieve the intensity ratio, at least two samples are used. These samples are taken at:

$$\delta_i = (i-1)\frac{T}{N} \quad (7)$$

$$i = 1, 2, \ldots N, N \geq 2$$

where N represents the number of shifting steps of the method. In the case of two-step triangular-pattern phase-shifting, as described above, N=2.

Algorithms to determine the intensity-ratio, which assist in determination of the 3-D coordinates of the measured object 35, are developed in detail below for different numbers of phase-shifting steps up to six. Those having ordinary skill in this art will appreciate that the algorithms for phase-shifting with more than six-steps can be similarly derived.

Figure 5:
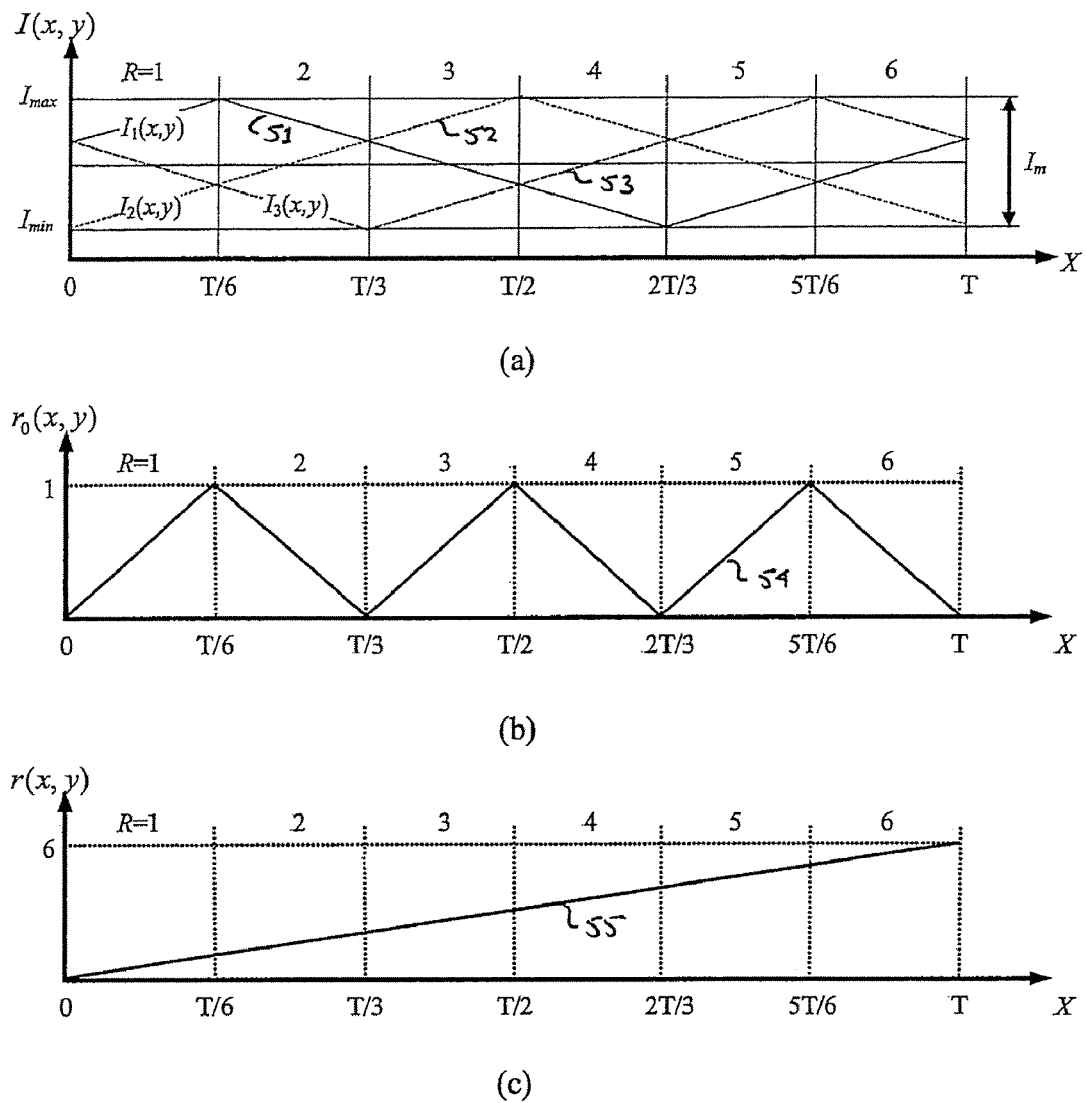
FIG. 5(a) graphically illustrates phase-shifted input triangular fringe patterns for use in three-step triangular-pattern phase-shifting in accordance with an embodiment of the present invention.
FIG. 5(b) graphically illustrates an intensity ratio arising from application of the 3-D measurement apparatus of FIG. 3 to the patterns of FIG. 5(a)
FIG. 5(c) graphically illustrates an intensity-ratio ramp according to an embodiment of the present invention.

For three-step triangular-pattern phase-shifting, three triangular patterns relatively phase-shifted by one-third of the pitch are used to reconstruct the 3-D object 35. FIG. 5(*a*) shows the cross sections of the three-step phase-shifted triangular fringe patterns 51, 52, 53.

The intensity ratio $r_0(x,y)$ can be calculated by:

$$r_0(x, y) = \frac{I_{high}(x, y) - I_{med}(x, y) + I_{low}(x, y) - I_{\min}(x, y)}{I_m(x, y)} \quad (8)$$

where $I_{high}(x,y)$, $I_{med}(x,y)$, and $I_{low}(x,y)$ are the highest, median and lowest intensities of the three shifted triangular patterns at the same position in the range of the pitch, respectively.

After operation of Equation (8), the triangular pattern is divided into six regions R=1 through 6, each with a different intensity ratio pattern.

The intensity ratio distribution $r_0(x,y)$ 54 over the full pitch is shown in FIG. 5(*b*) and is similar to that for two-step triangular-pattern phase-shifting, shown in FIG. 4(*c*) with values ranging from 0 to 1, but with three repeated triangles and six regions over the full pitch. The repeated triangles can be converted to a ramp 55 by applying Equation (5) with the region number R ranging from 1 to 6, as shown in FIG. 5(*c*).

Figure 6:
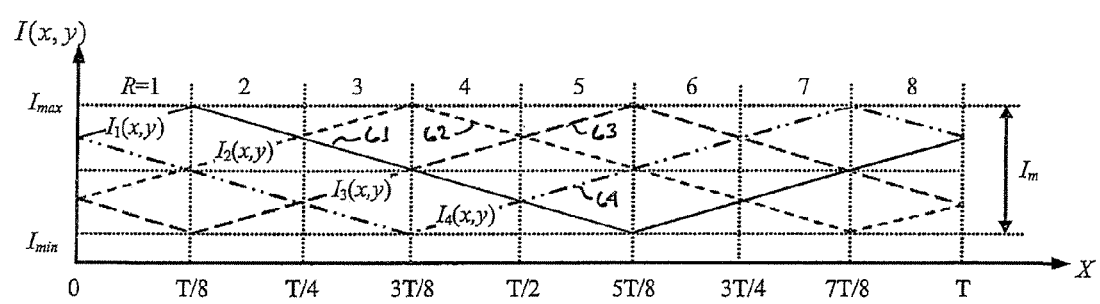
FIG. 6 graphically illustrates phase-shifted input triangular fringe patterns for four-step triangular-pattern phase-shifting in accordance with an embodiment of the present invention.

For four-step triangular-pattern phase-shifting, four triangular patterns 61-64, relatively phase-shifted by one-fourth of the pitch are used to reconstruct the 3-D object 35. FIG. 6 shows the cross sections of the four-step phase-shifted triangular fringe patterns 61-64.

The intensity ratio $r_0(x,y)$ can be calculated by:

$$r_0(x, y) = \frac{||I_1(x, y) - I_3(x, y)| - |I_2(x, y) - I_4(x, y)||}{I_m(x, y)} \quad (9)$$

where $I_1(x,y)$, $I_2(x,y)$, $I_3(x,y)$ and $I_4(x,y)$ are the intensities for the four shifted triangular patterns respectively.

After operation of Equation (9), the triangular pattern is divided into eight regions, R=1 through 8, each with a different intensity ratio pattern. The intensity ratio distribution $r_0(x,y)$ over the full pitch is similar to that for two-step triangular-pattern phase-shifting, shown in FIG. 4(c), with values ranging from 0 to 1, but with four repeated triangles and eight regions over the full pitch. The repeated triangles can be converted to a ramp by applying Equation (5) with the region number R ranging from 1 to 8.

Figure 7:
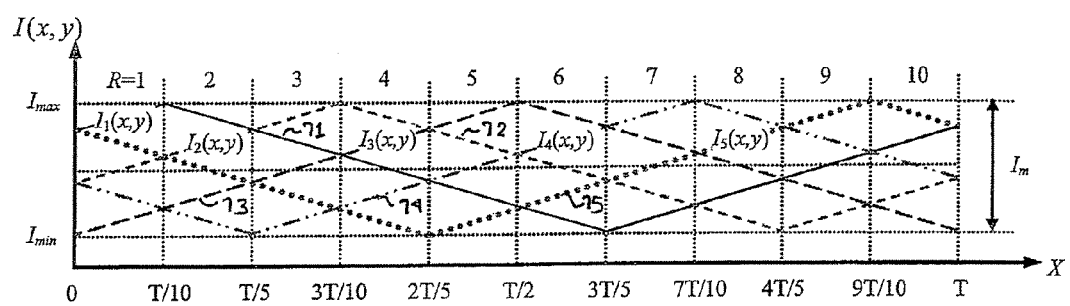
FIG. 7 graphically illustrates phase-shifted input triangular fringe patterns for five-step triangular-pattern phase-shifting in accordance with an embodiment of the present invention.

For five-step triangular-pattern phase-shifting, five triangular patterns 71-75, relatively phase-shifted by one-fifth of the pitch are used to reconstruct the 3-D object 35. FIG. 7 shows the cross sections of the five-step phase-shifted triangular fringe patterns 71-75.

The intensity ratio $r_0(x,y)$ can be calculated by:

$$r_0(x, y) = \frac{I_{high}(x, y) - I_{med1}(x, y) + I_{med2}(x, y) - I_{med3}(x, y) + I_{low}(x, y) - I_{min}(x, y)}{I_m(x, y)} \quad (10)$$

where $I_{high}(x,y)$, $I_{med1}(x,y)$, $I_{med2}(x,y)$, $I_{med3}(x,y)$, and $I_{low}(x,y)$ are the highest, second highest, third highest, fourth highest, and lowest intensities of the five shifted triangular patterns at the same position in the range of the pitch, respectively.

After operation of Equation (10), the triangular pattern is divided into ten regions R=1 through 10, each with a different intensity ratio pattern. The intensity ratio distribution $r_0(x,y)$ over the full pitch is similar to that for two-step triangular-pattern phase-shifting, shown in FIG. 4(c) with values ranging from 0 to 1, but with five repeated triangles and ten regions over the full pitch. The repeated triangles can be converted to a ramp by applying Equation (5) with the region number R ranging from 1 to 10.

Figure 8:
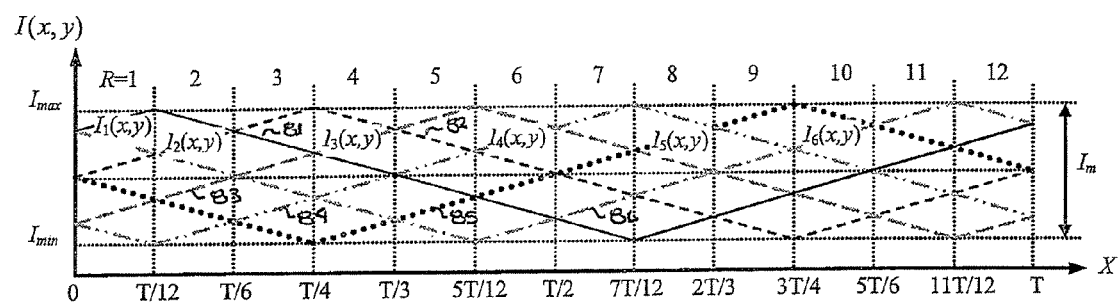
FIG. 8 graphically illustrates phase-shifted input triangular fringe patterns for six-step triangular-pattern phase-shifting in accordance with an embodiment of the present invention.

For six-step triangular-pattern phase-shifting, six triangular patterns 81-86, relatively phase-shifted by one-sixth of the pitch are used to reconstruct the 3-D object 35. FIG. 8 shows the cross sections of the six-step phase-shifted triangular fringe patterns.

The intensity ratio $r_0(x,y)$ can be calculated by:

$$r_0(x, y) = \frac{I_{high}(x, y) - I_{med1}(x, y) + I_{med2}(x, y) - I_{med3}(x, y) + I_{med4}(x, y) - I_{low}(x, y)}{I_m(x, y)} \quad (11)$$

where $I_{high}(x,y)$, $I_{med1}(x,y)$, $I_{med2}(x,y)$, $I_{med3}(x,y)$, $I_{med4}(x,y)$ and $I_{low}(x,y)$, are the highest, second highest, third highest, fourth highest, fifth highest, and lowest intensities of the six shifted triangular patterns at the same position in the range of the pitch, respectively.

After operation of Equation (11), the triangular pattern is divided into twelve regions R=1 through 12, each with a different intensity ratio pattern. The intensity ratio distribution $r_0(x,y)$ over the full pitch is similar to that for two-step triangular-pattern phase-shifting, shown in FIG. 4(c), with values ranging from 0 to 1, but with six repeated triangles and twelve regions over the full pitch. The repeated triangles can be converted to a ramp by applying Equation (5) with the region number R ranging from 1 to 12.

Measurement resolution and precision can be increased by using more triangular fringes. The intensity ratio is wrapped into the range of 0 to 4 for two-step phase-shifting; 0 to 6, for three-step phase-shifting; and 0 to 8, for four-step phase-shifting, etc.

The unwrapped intensity-ratio distribution may be obtained by removing the discontinuity of the wrapped intensity-ratio image with an unwrapping method modified from that commonly used in conventional sinusoidal phase-shifting.

Intensity-ratio-to-height conversion, based on phase-to-height conversion used in conventional sinusoidal phase-shifting, may be then used to retrieve the 3-D surface coordinates of the object 35 from the unwrapped intensity-ratio map.

The following intensity ratio-to-height conversion may be applicable to intensity ratio-to-height conversion for triangular-pattern phase-shifting with any number of shifting steps. The ratio-to-height conversion is similar to that of conventional sinusoidal phase-shifting in which the phase varies in the range of 0 to 2Π.

The wrapped intensity ratio for triangular phase-shifting has a sawtooth-like shape. Removing the discontinuity of the wrapped intensity ratio is possible where the range information of the object 35 is contained in this unwrapped intensity-ratio map and permits reconstruction of the 3-D shape of the object 35.

One suitable method to convert the phase map to the height of the 3-D object surface is phase-measuring profilometry. As with conventional sinusoidal phase-shifting, height information of the 3-D object surface is contained in the measured unwrapped intensity-ratio map for triangular-pattern phase-shifting. Therefore, an intensity ratio-to-height conversion retrieves the 3-D surface coordinates of the object 35 for triangular-pattern phase-shifting. The values of the parameters used in this algorithm are pre-determined by system calibration.

Figure 9:
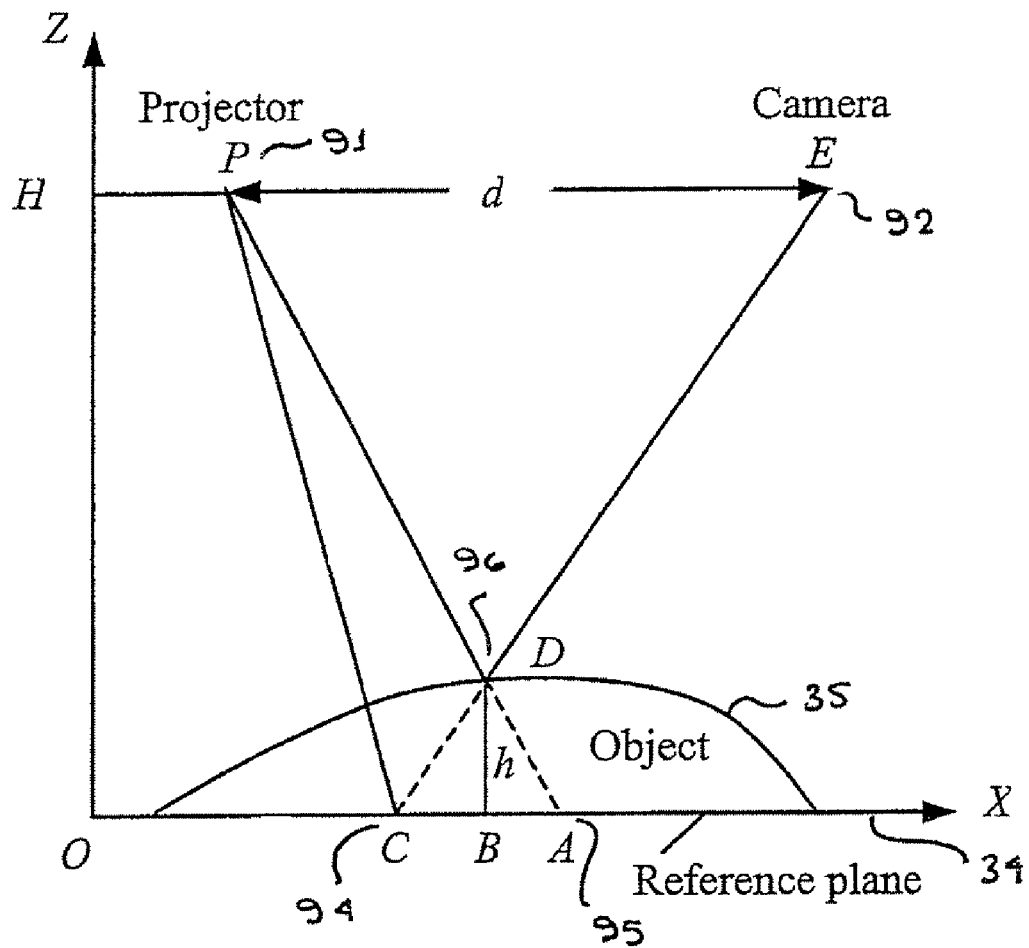
FIG. 9 illustrates a relationship between an intensity ratio of a projected triangular fringe pattern and a height of an object according to an embodiment of the present invention.

FIG. 9 shows the relationship between the intensity ratio of the projected triangular fringe pattern and the height of the object. Point P 91 is the center of the exit pupil of the projector 32, and point E 92 is the center of the entrance pupil of the camera 33. The position at z=0 in the coordinate system is defined as the reference plane 34. Points P 91 and E 92 are assumed to be on the same plane with a distance H to the reference plane 34. The distance between points P 91 and E 92 is d. The projector 32 projects a triangular fringe pattern with pitch p on the reference plane 34. The intensity ratio at point C 94 is $r_c$, and the intensity ratio at point A 95 is $r_A$.

In FIG. 9, because triangles ΔDPE and ΔDAC are similar, the following expression can be obtained.

$$\frac{d}{\overline{AC}} = \frac{H-h}{h} \quad (12)$$

where h is the distance of point D 96 on the object surface with respect to reference plane 34, and $\overline{AC}$ is the distance between points A 95 and C 94.

On the reference plane 34, the following expression holds:

$$\frac{\overline{AC}}{p} = \frac{r_A - r_C}{T} \tag{13}$$

where p is the fringe pitch on the reference plane 34, T is the fringe pitch of the pattern generated by the computer 31.

$\overline{AC}$ is the distance between points A 95 and C 94.

On the reference plane 34, the following expression holds:

$$\frac{\overline{AC}}{p} = \frac{r_A - r_C}{T} \tag{13}$$

where p is the fringe pitch on the reference plane 34, T is the fringe pitch of the pattern generated by the computer 31.

If $\Delta r_{AC} = r_A - r_C$ is defined as the intensity ratio difference between points A 95 and C 94, then by combining Equations (12) and (13), the height h of the object surface relative to the reference plane 34 can be calculated by:

$$h = \frac{H}{1 + \frac{Td}{p\Delta r_{AC}}} \tag{14}$$

This according to Equation (14) states that the distribution of the height of the object surface relative to the reference plane is a function of the distribution of the intensity ratio difference. During measurement, the reference plane 34 is measured first to generate an intensity ratio map for the reference plane 34. The measurement result will be used as the reference for the object 35 measurement. The height h of the object surface is then measured relative to the reference plane 34. When measuring the object 35, on the CCD array, point D 96 on the object surface will be imaged onto the same pixel as point C 94 on the reference plane 34. Because point D 96 on the object surface has the same intensity value as point A 95 on the reference plane 34, $r_D = r_A$. Thus, by subtracting the reference intensity ratio map from the object intensity ratio map, the intensity ratio difference $\Delta r_{AC} = r_A - r_C$ at this specific pixel can be easily obtained. This can be done for the whole intensity ratio map. Therefore, the height distribution of the object surface relative to the reference plane 34 is obtained.

Equation (14) describes a non-linear relationship between the distribution of the height and the distribution of the intensity ratio difference. Non-linear calculations are usually time consuming. To increase the speed of the 3-D object measurement, a modified form of Equation (14) using a linear relationship between the distribution of the height and the distribution of the intensity ratio difference can be used. Both linear and non-linear relationships were considered.

When H is much larger than h (or when d is much larger than $\overline{AC}$), which is true in general, Equation (14) can be simplified as:

$$h \approx \frac{pH}{Td}\Delta r \tag{15}$$

Thus, an approximate linear relationship between the intensity ratio difference map and the surface height of the object 35 is derived. However, Equation (14) was obtained only by considering that the points P 91, E 92, C 94, A 95, D 96 are located in the same X-Z plane. Typically, however, the object 35 has dimension in the Y direction. This means that the parameter H is not a fixed parameter, but is a function of the X and Y coordinates. Therefore, considering the x-y dimensions, the intensity ratio-height mapping function, Equation (15), for calculating the surface height of the object relative to the reference plane can be written as:

$$h(x, y) = K(x, y)\Delta r(x, y) \tag{16}$$

where $$K(x, y) = \frac{pH(x, y)}{Td}.$$

K(x,y) is a coefficient of the optical setup, which is the function of (x, y)

The intensity ratio difference $\Delta r(x,y)$ can be calculated by:

$$\Delta r(x,y) = r(x,y) - r_r(x,y) \tag{17}$$

where r(x,y) is the distorted fringe intensity ratio distribution of the object surface, $r_r(x,y)$ is the reference fringe intensity ratio distribution taken from a planar reference plane, and $\Delta r(x,y)$ is the intensity ratio difference between r(x,y) and $r_r(x,y)$.

Both r(x,y) and $r_r(x,y)$ can be obtained from the calculation of Equation (5) and an intensity ratio unwrapping method if the triangular pattern is repeated. If for some points, coefficient K(x,y) is known, the following equation can be used to calculate the intensity ratio difference at these points:

$$\Delta r(x, y) = \frac{h(x, y)}{K(x, y)} \tag{18}$$

To get the non-linear relationship between the intensity ratio difference map and the surface height of the object, Equation (14) can be rearranged as follows:

$$\Delta r = \frac{\frac{Td}{pH}h}{1 - \frac{1}{H}h} \tag{19}$$

Considering the x-y dimensions, Equation (19) can be expressed simply as:

$$\Delta r(x, y) = \frac{m(x, y)h(x, y)}{1 - n(x, y)h(x, y)} \tag{20}$$

where $$m(x, y) = \frac{Td}{pH(x, y)},$$

$$n(x, y) = \frac{1}{H(x, y)},$$

m(x,y) and n(x,y) are system parameters relating to the optical setup, and x, y are the pixel coordinates.

Equation (20) can be rewritten as the following intensity ratio-height mapping function:

$$h(x, y) = \frac{\Delta r(x, y)}{m(x, y) + n(x, y)\Delta r(x, y)} \quad (21)$$

This is the non-linear relationship between the intensity-ratio difference map and the surface height of the object 35.

Equations (16) and (21) can be used to calculate the height of the object surface relative to the reference plane 34 only if all the system parameters and the fringe pitch on the reference plane are known. Although the parameters H (in the X-Z plane) and d in Equation (15) could be measured, it is difficult to precisely determine the parameter p, the fringe pitch in the reference plane 34. Calibration that determines the height of the object 35 from the intensity-ratio difference values, without knowledge of all parameters related to the system configuration, is therefore advantageous.

Figure 10:
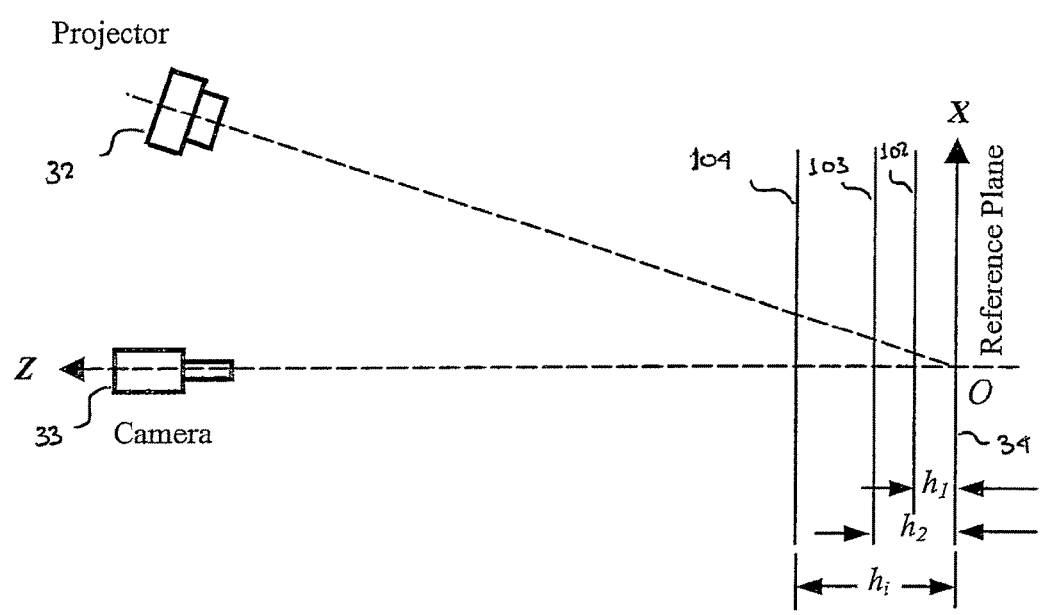
FIG. 10 is a schematic representation of a measurement system calibration setup according to an embodiment of the present invention.

As the relationship between the intensity-ratio difference map and the surface height of the object 35 is formulated above as linear and non-linear, calibration by both of these methods may be performed to obtain the system-related parameters. FIG. 10 illustrates the measurement system calibration setup.

For linear calibration, to determine the coefficient K in Equation (16), in the coordinate system of FIG. 10, either the calibration object or the reference plane must be translated through a known distance along the Z direction relative to the reference plane 34 at O 101. Here the reference plane 34 is translated to different positions 102-104 with given depths $h_i$.

By applying Equation (16), the intensity ratio-height relationship for each pixel is determined as follows:

$$h_i(x,y) = K(x,y)\Delta r_i(x,y) \quad i=1,2,\ldots N \quad (22)$$

and the intensity-ratio difference $\Delta r_i(x,y)$ is obtained by:

$$\Delta r_i(x,y) = r_i(x,y) - r_r(x,y) \quad i=1,2,\ldots N \quad (23)$$

where $r_i(x,y)$ is the calibrated intensity ratio distribution due to the translation $h_i$ of the calibrated plane relative to the reference plane, $r_r(x,y)$ is the intensity ratio distribution of the reference plane, and N is the number of calibration positions. both $r_i(x,y)$ and $r_r(x,y)$ can be obtained by applying Equation (5) and an intensity ratio unwrapping method if the triangular pattern is repeated.

Because of the linear relationship, the coefficient K can be obtained by only one calibration position (N=1). For the purpose of increasing the measurement resolution and accuracy, however, in practice, the system is calibrated by shifting the calibration plate to several different positions. Applying the least-squares algorithm to linear Equation (22), the following equation may be used to obtain the coefficient K:

$$K(x, y) = \frac{\sum_{i=1}^{N} \Delta r_i(x, y) h_i(x, y)}{\sum_{i=1}^{N} \Delta r_i^2(x, y)} \quad (24)$$

Non-linear calibration is similar to linear calibration except that two parameters m(x,y) and n(x,y) are determined as in Equation (21). The minimum number of calibration positions is two (N=2). The intensity-ratio difference can be obtained using the same method as in linear calibration.

For the purpose of increasing accuracy, more calibration positions (N>2) may be used in practice to perform non-linear calibration. A least-squares method may be applied to determine parameters m(x,y) and n(x,y) in Equation (21), which can be rearranged as:

$$\Delta r(x,y) = m(x,y)h(x,y) + n(x,y)h(x,y)\Delta r(x,y) \quad (25)$$

By choosing h(x,y) and h(x,y)r(x,y) as the basis functions, and applying the least-squares algorithm, the sum of squares is:

$$q = \sum_{i=1}^{N} [\Delta r_i(x, y) - m(x, y)h_i(x, y) - n(x, y)h_i(x, y)r_i(x, y)]^2, \quad (26)$$

where q depends on m(x,y) and n(x,y).

A necessary condition for q to be minimum is $$\frac{\partial q}{\partial m(x, y)} = \quad (27)$$

$$-2\sum_{i=1}^{N} [\Delta r_i(x, y) - m(x, y)h_i(x, y) - n(x, y)h_i(x, y)\Delta r_i(x, y)]$$

$$h_i(x, y) = 0$$

$$\frac{\partial q}{\partial n(x, y)} = \quad (28)$$

$$-2\sum_{i=1}^{N} [\Delta r_i(x, y) - m(x, y)h_i(x, y) - n(x, y)h_i(x, y)\Delta r_i(x, y)]$$

$$h_i(x, y)\Delta r_i(x, y) = 0$$

which can be arranged as:

$$\left. \begin{aligned} m(x, y)\sum_{i=1}^{N} h_i^2(x, y) + n(x, y)\sum_{i=1}^{N} h_i^2(x, y)\Delta r_i(x, y) &= \sum_{i=1}^{N} h_i(x, y)\Delta r_i(x, y) \\ m(x, y)\sum_{i=1}^{N} h_i^2(x, y)\Delta r_i(x, y) + n(x, y)\sum_{i=1}^{N} h_i^2(x, y)\Delta r_i^2(x, y) &= \sum_{i=1}^{N} h_i(x, y)\Delta r_i^2(x, y) \end{aligned} \right\} \quad (29)$$

Equation (29) can be written in matrix form as:

$$\begin{pmatrix} a_1(x,y) & a_2(x,y) \\ a_2(x,y) & a_3(x,y) \end{pmatrix} \begin{pmatrix} m(x,y) \\ n(x,y) \end{pmatrix} = \begin{pmatrix} b_1(x,y) \\ b_2(x,y) \end{pmatrix} \quad (30)$$

where $$a_1(x,y) = \sum_{i=1}^{N} h_i^2(x,y),$$

$$a_2(x,y) = \sum_{i=1}^{N} h_i^2(x,y)\Delta r_i(x,y),$$

$$a_3(x,y) = \sum_{i=1}^{N} h_i^2(x,y)\Delta r_i^2(x,y),$$

$$b_1(x,y) = \sum_{i=1}^{N} h_i(x,y)\Delta r_i(x,y), \text{ and}$$

$$b_2(x,y) = \sum_{i=1}^{N} h_i(x,y)\Delta r_i^2(x,y).$$

The parameters m(x,y) and n(x,y) in Equation (30) can be solved as:

$$\left.\begin{array}{l} m(x,y) = \dfrac{a_3(x,y)b_1(x,y) - a_2(x,y)b_2(x,y)}{a_1(x,y)a_3(x,y) - a_2^2(x,y)} \\ n(x,y) = \dfrac{a_1(x,y)b_2(x,y) - a_2(x,y)b_1(x,y)}{a_1(x,y)a_3(x,y) - a_2^2(x,y)} \end{array}\right\} \quad (31)$$

The procedure described in respect of linear calibration may now be applied to obtain the parameter m(x,y) and n(x,y).

After completing the calibration and getting the intensity-ratio difference distribution, the 3-D data of the object can be calculated from Equation (21).

The measurement accuracy of the triangular-pattern phase-shifting method relies on the accuracy of the measured intensity-ratio. Gamma curve non-linearity of the projector and image defocus are major sources of error in digital fringe-projection techniques.

Intensity-ratio error compensation, motivated by a phase-error compensation approach (cf. Zhang, S. and Huang, P. S. "Phase error compensation for a 3=D shape measurement system based on the phase-shifting method", *Two-and three-dimensional methods for inspection and metrology III*, Harding K G, ed. *Proc. SPIE,* 6000, E1-10, 2005) to decrease the measurement error due to projector gamma non-linearity and image defocus in the triangular-pattern phase-shifting measurement is described below.

Without loss of generality, the principle of intensity-ratio error compensation is introduced for two-step triangular-pattern phase-shifting; however, intensity-ratio error compensation as developed below is applicable to all triangular-pattern phase-shifting with a different number of phase-shifting steps.

Intensity-ratio error compensation involves estimating intensity-ratio error in a simulation of the triangular-pattern phase-shifting measurement process with both real and ideal captured triangular-pattern images obtained from real and ideal gamma non-linearity functions. A look-up-table (LUT) relating the measured intensity-ratio to the corresponding intensity-ratio error is constructed and used for intensity-ratio error compensation, and thus shape-measurement error compensation.

Figure 11:
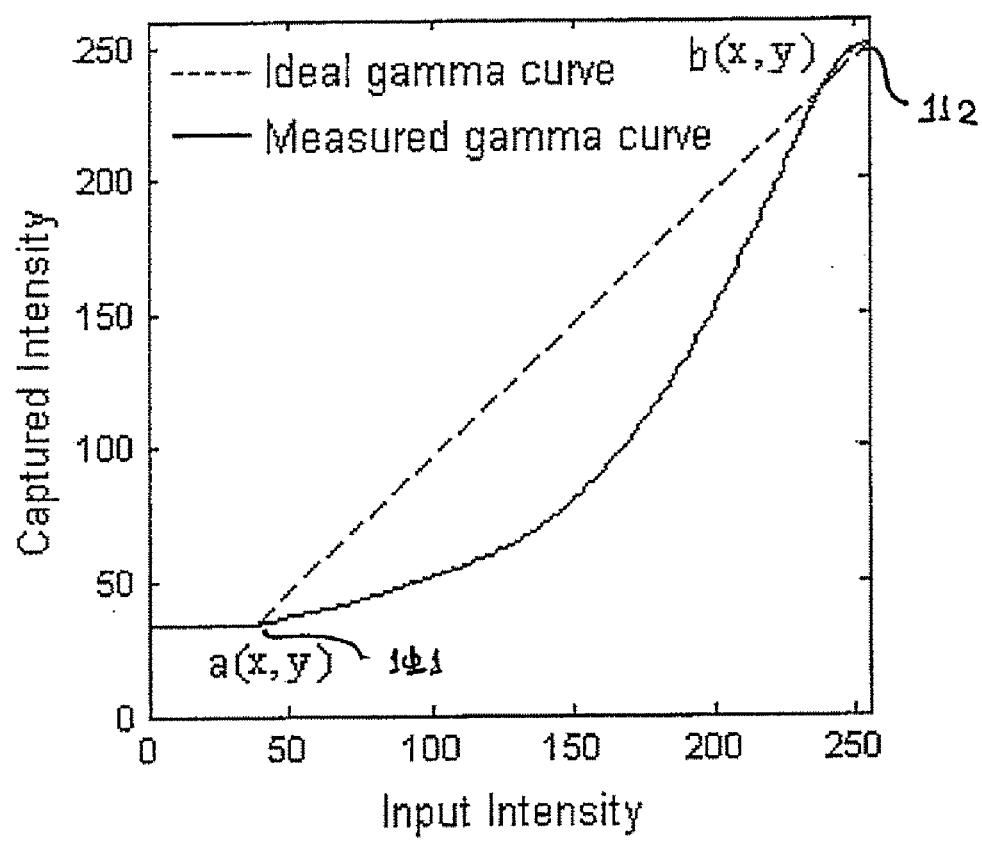
FIG. 11 illustrates a non-linear mapping of projector input intensity to camera-captured image intensity according to an embodiment of the present invention.

The intensity response of an experimental measurement system is first determined by projecting a linear grey-scale pattern with minimum intensity 0 and maximum intensity 255 onto a white flat plate. An image of the reflected pattern is captured by the CCD camera 33. An exemplary relationship between the intensity values input to the projector 32 and those captured by the CCD camera 33 is shown in FIG. 11. The intensity values of the captured image are only sensitive to input intensity values higher than a sensitivity threshold of about 40, and they have very low sensitivity to input intensities up to 90. The captured image intensities increase non-linearly through the mid-range intensities to about 190, have a nearly linear increase for the higher input intensity values beyond 190 to about 240; and then increase non-linearly to about 250.

The impact of both gamma non-linearity and defocus of the projector 32 on the intensity mapping curve is revealed in FIG. 11. It is noted that non-linear response beyond about 240 is mainly generated by defocus of the projector 32.

To determine the intensity-ratio error caused by the non-linearity between the pattern input to the projector 32 and the image captured by the camera 33, a simulation to retrieve the intensity-ratio error is carried out. First, a polynomial curve is fit to the measured gamma curve data (FIG. 5), and an ideal gamma curve is drawn as a straight line between points a(x,y) 111, corresponding to the intensity sensitivity threshold, discussed above, and b(x,y) 112, the curve endpoint.

Figure 12:
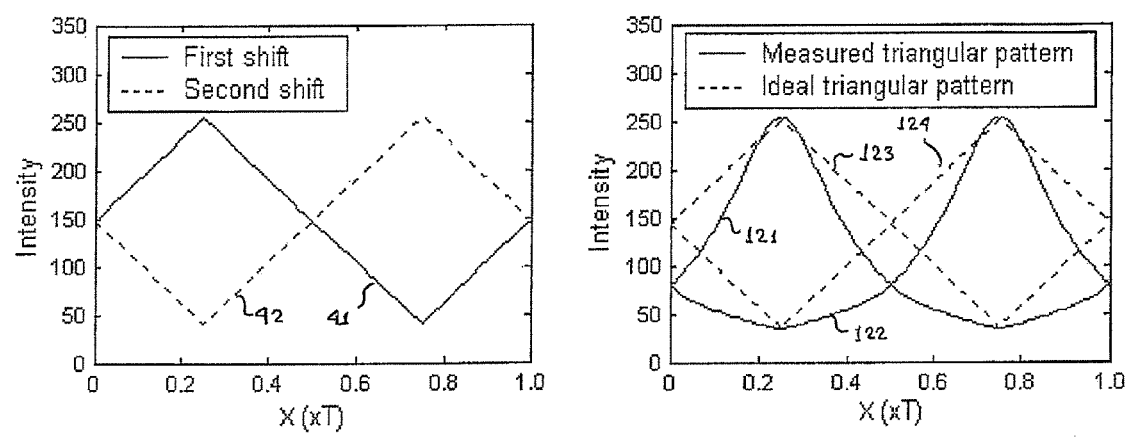
FIG. 12(a) illustrates an exemplary input triangular pattern for use in error correction.
FIG. 12(b) illustrates a simulated captured triangular pattern image with measured and ideal gamma curve functions corresponding to the exemplary input triangular pattern of FIG. 12(a)

Two phase-shifted triangular patterns 41, 42 are then generated by Equations (1) and (2) using a minimum input intensity value of 40 and maximum input intensity value of 255, as shown in FIG. 12(a). Using these two phase-shifted triangular patterns 41, 42 as input patterns to the projector 32, a simulation can be performed to generate simulated captured triangular-pattern images corresponding to the measured 121, 122 and ideal 123, 124 gamma curves, shown in FIG. 12(b). The measured intensity error due to the gamma non-linearity and image defocus is apparent.

Figure 13:
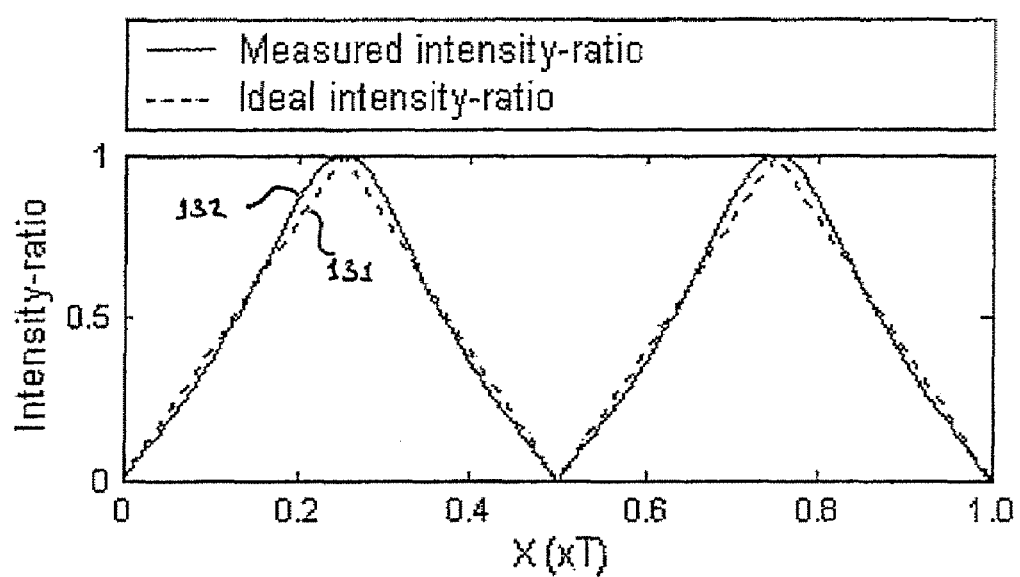
FIG. 13 illustrates a measured and ideal intensity-ratio with periodic triangular shape according to an embodiment of the present invention.
Figure 14:
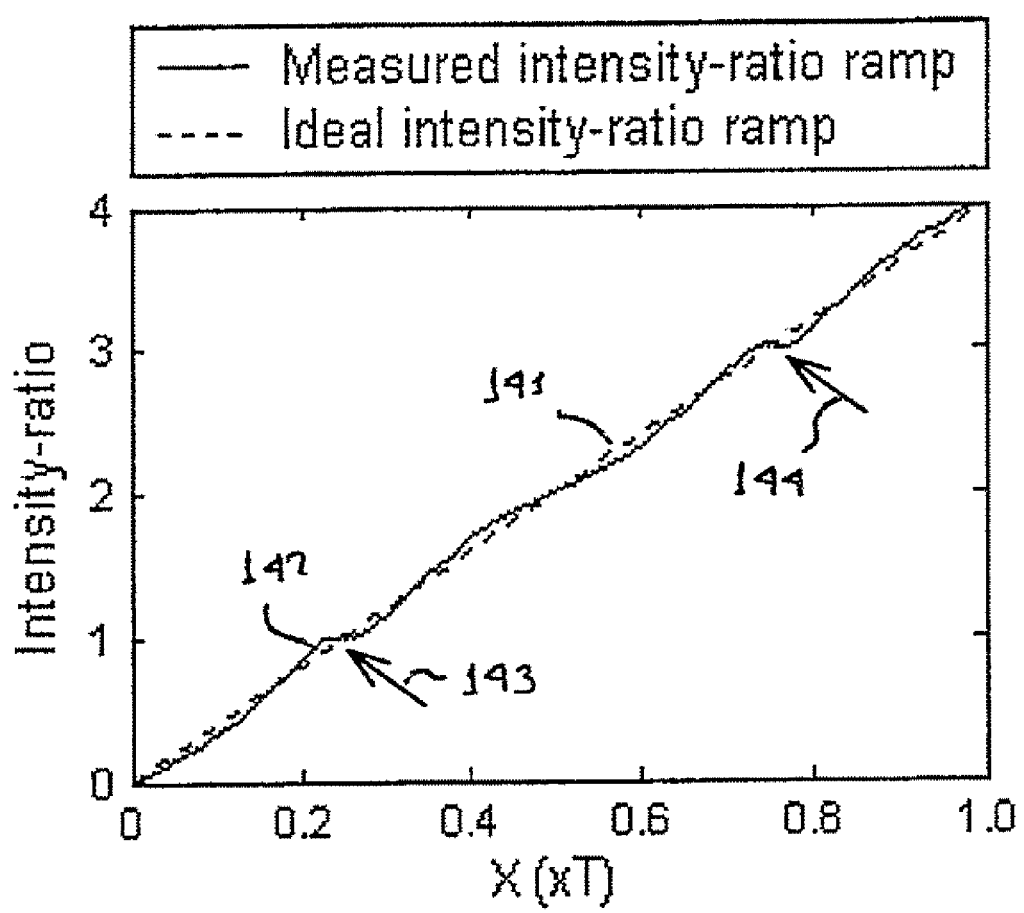
FIG. 14 illustrates a measured and ideal intensity-ratio ramp after conversion from the triangular shape of FIG. 13.

The intensity-ratio $r_0(x,y)$ computed using Equation (4) for both measured 132 and ideal 131 triangular pattern images is shown in FIG. 13, and the intensity-ratio ramp computed using Equation (5) for both measured 142 and ideal 141 intensity-ratios is shown in FIG. 14.

In this figure, the ideal intensity-ratio ramp 141 is a sloped straight line, while the measured intensity-ratio ramp 142 is characterized by a periodic error curve. The difference between them is the measured intensity-ratio error 151, shown in FIG. 15.

Errors indicated by arrows 143, 144 are mainly due to defocus while other errors are mainly due to gamma non-linearity. The two maximum intensity-ratio errors occur where the intensity ratio r(x,y) has values of 1 143 and 3 144. As can be seen from FIGS. 4(a), 4(b) and 4(c), these maxima correspond to the peaks of the projected triangular-fringe pattern, at T/4 and 3T/4, respectively. This indicates that the major intensity-ratio error is caused by the projected pattern defocus, where the sharp peaks are blurred into curves.

Figure 15:
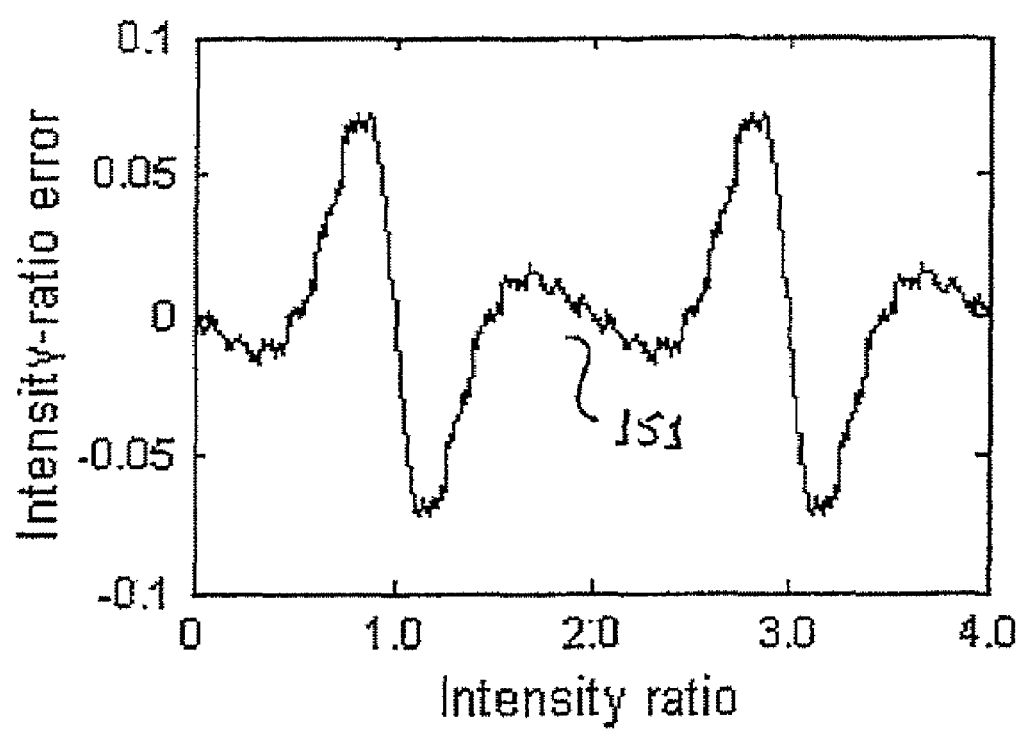
FIG. 15 illustrates intensity-ratio error as a function of intensity ratio according to an embodiment of the present invention.

The intensity-ratio error, shown in FIG. 15, is a single-valued function of the intensity ratio. By constructing a look-up table (LUT), which maps the intensity-ratio error as a function of measured intensity-ratio, intensity-ratio error compensation can be implemented. A LUT would be constructed separately for each type of triangular-pattern phase-shifting, corresponding to different numbers of steps. However, for a given method, the LUT would only be constructed once, as long as the positions and orientations of the projector 32 and camera 33 are not changed.

The intensity response of an experimental measurement system and the mapping of the intensity-ratio error to the measured intensity-ratio will be specific to the projector 32 and camera 33. The intensity values given above are exemplary only. Those having ordinary skill in this art will readily appreciate that other intensity values could be used for other projectors 32 or cameras 33.

The present invention can be implemented in digital electronic circuitry, or in computer hardware, firmware, software, or in combination thereof. Apparatus of the invention can be implemented in a computer program product tangibly embodied in a machine-readable storage device for execution by a programmable processor; and methods actions can be performed by a programmable processor executing a program of instructions to perform functions of the invention by operating on input data and generating output. The invention can be implemented advantageously in one or more computer programs that are executable on a programmable system including at least one input device, and at least one output device. Each computer program can be implemented in a high-level procedural or object oriented programming language, or in assembly or machine language if desired; and in any case, the language can be a compiled or interpreted language.

Suitable processors include, by way of example, both general and specific microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; CD-ROM disks; and buffer circuits such as latches and/or flip flops. Any of the foregoing can be supplemented by, or incorporated in ASICs (application-specific integrated circuits), FPGAs (field-programmable gate arrays) or DSPs (digital signal processors).

Examples of such types of computers are programmable processing systems suitable for implementing or performing the apparatus or methods of the invention. The system may comprise a processor, a random access memory, a hard drive controller, and an input/output controller coupled by a processor bus.

It will be apparent to those skilled in this art that various modifications and variations may be made to the embodiments disclosed herein, consistent with the present invention, without departing from the spirit and scope of the present invention.

Other embodiments consistent with the present invention will become apparent from consideration of the specification and the practice of the invention disclosed therein.

Accordingly, the specification and the embodiments are to be considered exemplary only, with a true scope and spirit of the invention being disclosed by the following claims.

The embodiments of the present invention for which an exclusive property or privilege is claimed are:

1. A fringe light projection method for use with a system for measuring three-dimensional surface-geometry of an object comprising steps of:

a) projecting a first triangular coded fringe pattern onto a surface of the object at a specified pitch and along a first direction to produce a first distorted fringe pattern on the object surface;

b) capturing, from along a second direction from the projected triangular coded fringe pattern, a first fringe-pattern image of the first distorted fringe pattern;

c) projecting at least one additional triangular coded fringe pattern onto a surface of the object at the specified pitch having a phase step relative to each other triangular coded fringe pattern and along the first direction to produce a corresponding at least one additional distorted fringe pattern on the object surface;

d) capturing, from along the second direction from the projected triangular coded fringe pattern, at least one additional fringe pattern image corresponding to the at least one additional distorted fringe pattern;

e) calculating a distribution of intensity ratios as a function of the first and the at least one additional fringe pattern image, divided by an intensity modulation; and f) calculating a height distribution relative to a pre-determined reference plane, whereby the three-dimensional surface geometry of the object may be determined.

2. A method as claimed in claim 1, wherein the height distribution is based on the distinction of intensity ratios.

3. A method as claimed in claim 1, wherein step e) further comprises formulating a first triangular shape intensity and at least one additional triangular shape intensity corresponding to the first and the at least one additional fringe pattern image respectively in accordance with the relations:

$$I_i(x, y) = \begin{cases} \frac{2I_m(x,y)}{T}(x+\delta_i) + I_{\min}(x,y) + \frac{I_m(x,y)}{2} & x+\delta_i \in \left[0, \frac{T}{4}\right) \\ -\frac{2I_m(x,y)}{T}(x+\delta_i) + I_{\min}(x,y) + \frac{3I_m(x,y)}{2} & x+\delta_i \in \left[\frac{T}{4}, \frac{3T}{4}\right) \\ \frac{2I_m(x,y)}{T}(x+\delta_i) + I_{\min}(x,y) - \frac{3I_m(x,y)}{2} & x+\delta_i \in \left[\frac{3T}{4}, T\right) \end{cases}$$

$$I_m(x,y) = I_{\max}(x,y) - I_{\min}(x,y)$$

where $I_i(x,y)$ is an intensity value of the ith triangular pattern image, corresponding to an ith phase shift at pixel (x,y);

T is the specified pitch;

$I_m(x,y)$ is an intensity modulation for the triangular coded fringe pattern images;

$I_{min}(x,y)$ and $I_{max}(x,y)$ are a minimum and maximum intensity for the triangular coded fringe pattern images, respectively;

$\delta_i$ is an ith phase shift distance in an X direction represented by the relation:

$$\delta_i = (i-1)\frac{T}{N}$$

$$i = 1, 2, \ldots N, N \geq 2$$

where N represents a number of fringe pattern images.

4. A method as claimed in claim 3, wherein in step e), an intensity-ratio $r_0(x,y)$ is determined in accordance with the relation:

$$r_0(x, y) = \frac{|I_1(x, y) - I_2(x, y)|}{I_m(x, y)}.$$

5. A method as claimed in claim 4, wherein the intensity ratio is converted into an intensity-ratio ramp map r(x,y) of the first and the at least one additional triangular pattern images in a range of the specified pitch in accordance with the relation:

$$r(x, y) = 2 \times \text{round}\left(\frac{R-1}{2}\right) + (-1)^{R+1} r_0(x, y)$$
$$R = 1, 2, 3 \ldots 2N,$$

where R is an ordinal region number; and
r(x,y) ranges from 0 to 2N.

6. A method as claimed in claim 5, wherein step f) calculates a height h at a point D on a surface of the object relative to a reference plane in accordance with the relation:

$$h = \frac{H}{1 + \frac{Td}{p\Delta r_{AC}}}$$

where H is a distance between a line defined by a first projector point P and a first camera point E and the reference plane;
 d is a distance between the points P and E;
 p is the specified pitch on the reference plane; and
 $\Delta r_{AC} = r_A - r_C$;
where $r_C$ is an intensity ratio at a point C on the reference plane imaged onto a same pixel as point D; and
 $r_A$ is an intensity ratio equal to an intensity ratio at point D captured at a point A on the reference plane.

7. The method as claimed in claim 6, wherein the height distribution is a function of x and y coordinates in accordance with the relation:

$$h(x,y) = K(x,y)\Delta r(x,y)$$

where h(x,y) is a surface height of the object relative to the reference plane;
 K(x,y) is a pre-determined optical setup coefficient defined by the relation:

$$K(x, y) = \frac{pH(x, y)}{Td};$$

x and y are pixel coordinates; and
where an intensity ratio difference $\Delta r(x,y)$ is calculated as a difference between:
 r(x,y), which is a pre-determined distorted fringe intensity ratio distribution of the object surface; and
 $r_r(x,y)$, which is a predetermined reference fringe intensity ratio distribution from the reference plane.

8. A method as claimed in claim 6, wherein the height distribution is a function of x and y coordinates in accordance with the equation:

$$h(x, y) = \frac{\Delta r(x, y)}{m(x, y) + n(x, y)\Delta r(x, y)}$$

where h(x,y) is a surface height of the object relative to the reference plane;

$$m(x, y) = \frac{Td}{pH(x, y)};$$

$$n(x, y) = \frac{1}{H(x, y)};$$

m and n are pre-determined optical setup parameters; and
x, y are pixel coordinates; and
where $\Delta r(x,y)$ is an intensity ratio difference between:
 r(x,y), which is a pre-determined distorted fringe intensity ratio distribution of the object surface; and
 $r_r(x,y)$, which is a pre-determined reference fringe intensity ratio distribution from the reference plane.

9. A method as claimed in claim 1, further comprising, prior to step a), the step of calibrating at least one optical parameter.

10. A method as claimed in claim 1, further comprising, the steps of:
 g) estimating intensity-ratio error corresponding to a projector along the first direction and an image captor along the second direction;
 h) constructing a look-up table that relates measured intensity-ratio values to a corresponding intensity-ratio error; and
 i) applying a intensity-ratio error corresponding to a measured intensity-ratio value to compensate for shape-measurement error inherent in the projector and image captor.

11. A method as claimed in claim 10, wherein step g) comprises:
 g.1) projecting a linear gray-scale pattern with an intensity range onto a planar surface along the first direction;
 g.2) capturing an image of a reflected pattern from along the second direction;
 g.3) fitting a polynomial curve to each of measured gamma curve data for the reflected pattern and ideal gamma curve data.
 g.4) projecting a plurality of triangular coded fringe patterns onto the planar surface at the specified pitch and along the first direction to produce a corresponding plurality of distorted reference fringe patterns on the planar surface;
 g.5) capturing, from along the second direction, a plurality of reference fringe-pattern images corresponding to the plurality of distorted reference fringe patterns;
 g.6) simulating a plurality of expected reference fringe-pattern images corresponding to the plurality of expected distorted reference fringe patterns; and
 g.7) measuring a difference between corresponding pairs of reference fringe-pattern images and expected reference fringe-pattern images.

12. A computer-readable medium in a fringe light projection system for measuring three-dimensional surface-geometry of an object, the medium having stored thereon, computer-readable and computer-executable instructions, which, when executed by a processor, cause the processor to perform steps comprising:

a) projecting a first triangular coded fringe pattern onto a surface of the object at a specified pitch and along a first direction to produce a first distorted fringe pattern on the object surface;
b) capturing, from along a second direction from the projected triangular coded fringe pattern, a first fringe-pattern image of the first distorted fringe pattern;
c) projecting at least one additional triangular coded fringe pattern onto a surface of the object at the specified pitch having a phase step relative to each other triangular coded fringe pattern and along the first direction to produce a corresponding at least one additional distorted fringe pattern on the object surface;
d) capturing, from along the second direction from the projected triangular coded fringe pattern, at least one additional fringe pattern image corresponding to the at least one additional distorted fringe pattern;
e) calculating an intensity ratio distribution as a function of the first and the at least one additional fringe pattern image, divided by an intensity modulation; and
f) calculating a height distribution relative to a pre-determined reference plane, whereby the three-dimensional surface geometry of the object may be determined.

13. A fringe light projection system for measuring three-dimensional geometry of an object comprising:
   a projector for projecting a plurality of triangular coded fringe patterns relatively spaced-apart by a phase step onto a surface of the object at a specific pitch and along a first direction to produce a plurality of distorted fringe patterns;
   an image captor for capturing, along a second direction from the projected triangular coded fringe patterns, a plurality of corresponding fringe-pattern images of each distorted fringe pattern;
   an intensity ratio generator for calculating an intensity ratio distribution as a function of the plurality of corresponding fringe pattern images of each distorted fringe pattern, divided by an intensity modulation; and
   a height distribution calculator for calculating a height distribution relative to a pre-determined reference plane based on the intensity ratio distribution, to thus determine the three-dimensional surface geometry of the object.

* * * * *